(12) United States Patent
Line et al.

(10) Patent No.: US 10,377,279 B2
(45) Date of Patent: Aug. 13, 2019

(54) INTEGRATED DECKING ARM SUPPORT FEATURE

(71) Applicant: Ford Global Technologies, LLC, Dearborn, MI (US)

(72) Inventors: Johnathan Andrew Line, Northville, MI (US); Marcos Silva Kondrad, Macomb, MI (US); Richard Joseph Soyka, Jr., Shelby Township, MI (US); S. M. Akbar Berry, Windsor (CA); Carol Casey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 326 days.

(21) Appl. No.: 15/228,888

(22) Filed: Aug. 4, 2016

(65) Prior Publication Data
US 2017/0355292 A1    Dec. 14, 2017

Related U.S. Application Data

(63) Continuation-in-part of application No. 15/178,258, filed on Jun. 9, 2016, now Pat. No. 10,166,894.

(51) Int. Cl.
*B60N 2/64* (2006.01)
*B60N 2/68* (2006.01)
(Continued)

(52) U.S. Cl.
CPC ............. *B60N 2/68* (2013.01); *B60N 2/0232* (2013.01); *B60N 2/2222* (2013.01);
(Continued)

(58) Field of Classification Search
CPC .......... B60N 2/643; B60N 2/68; B60N 2/682; B60N 2/686; B60N 2/7011; B60N 2/2222
See application file for complete search history.

(56) References Cited

U.S. PATENT DOCUMENTS 616,178 A    12/1898 Barron
771,773 A    10/1904 Feely
(Continued)

FOREIGN PATENT DOCUMENTS

CN    201650491 U    11/2010
CN    203097995 U    7/2013
(Continued)

OTHER PUBLICATIONS

Matthew W Ing, United States Patent and Trademark Office, Non Final Office Communication re U.S. Appl. No. 13/749,561, dated Oct. 16, 2015, 33 pages.
(Continued)

*Primary Examiner* — Ryan D Kwiecinski
(74) *Attorney, Agent, or Firm* — Vichit Chea; Price Heneveld LLP

(57) ABSTRACT

A seating assembly includes a seatback having a frame and a cushion assembly. A cushion carrier includes a lower member defining a frame receiving cavity. A first set of ribs extend across the frame receiving cavity in a direction perpendicular to a longitudinal extent of the lower member. The first set of ribs extend between the lower member and a lower brace of the frame. A second set of ribs are parallel with the first set of ribs. The second set of ribs are longer than the first set of ribs.

20 Claims, 17 Drawing Sheets

(51) Int. Cl.
- *B60N 2/22* (2006.01)
- *B60N 2/70* (2006.01)
- *B60N 2/58* (2006.01)
- *B60N 2/02* (2006.01)
- *B60N 2/90* (2018.01)

(52) U.S. Cl.
CPC .......... *B60N 2/5825* (2013.01); *B60N 2/643* (2013.01); *B60N 2/682* (2013.01); *B60N 2/686* (2013.01); *B60N 2/7011* (2013.01); *B60N 2/986* (2018.02)

(56) References Cited

U.S. PATENT DOCUMENTS

| | | |
|---|---|---|
| 1,125,155 A | 1/1915 | Nunn |
| 2,272,505 A | 2/1942 | Biggs |
| 2,661,050 A | 12/1953 | Felter |
| 2,725,921 A | 12/1955 | Markin |
| 2,834,606 A | 5/1958 | Bertrand |
| 2,938,570 A | 5/1960 | Flajole |
| 2,958,369 A | 11/1960 | Pitts et al. |
| 3,007,738 A | 11/1961 | Gardel et al. |
| 3,018,133 A | 1/1962 | Mills |
| 3,273,877 A | 9/1966 | Geller et al. |
| 3,330,598 A | 7/1967 | Whiteside |
| 3,403,938 A | 10/1968 | Cramer et al. |
| 3,481,327 A | 12/1969 | Drennen |
| 3,512,605 A | 5/1970 | McCorkle |
| 3,520,327 A | 7/1970 | Claydon et al. |
| 3,550,953 A | 12/1970 | Neale |
| 3,592,508 A | 7/1971 | Druseikis |
| 3,612,607 A | 10/1971 | Lohr |
| 3,632,166 A | 1/1972 | Lohr |
| 3,663,057 A | 5/1972 | Lohr et al. |
| 3,669,492 A | 6/1972 | Peterson |
| 3,779,577 A | 12/1973 | Wilfert |
| 3,792,897 A | 2/1974 | Alson |
| 3,795,021 A | 3/1974 | Moniot |
| 3,813,151 A | 5/1974 | Cadiou |
| 3,833,257 A | 9/1974 | Dove |
| 3,877,749 A | 4/1975 | Sakurai et al. |
| 3,880,462 A | 4/1975 | Mednick |
| 3,883,173 A | 5/1975 | Shephard et al. |
| 3,885,831 A | 5/1975 | Rasmussen |
| 3,915,421 A | 10/1975 | Le Forestier |
| 3,929,374 A | 12/1975 | Hogan et al. |
| 4,017,118 A | 4/1977 | Cawley |
| 4,018,477 A | 4/1977 | Hogan |
| 4,058,342 A | 11/1977 | Ettridge |
| 4,115,170 A | 9/1978 | Sanson |
| 4,190,286 A | 2/1980 | Bentley |
| 4,205,877 A | 6/1980 | Ettridge |
| 4,225,989 A | 10/1980 | Corbett et al. |
| 4,306,322 A | 12/1981 | Young et al. |
| 4,324,431 A | 4/1982 | Murphy et al. |
| 4,334,709 A | 6/1982 | Akiyama et al. |
| 4,353,595 A | 10/1982 | Kaneko et al. |
| 4,366,985 A | 1/1983 | Leffler |
| 4,415,203 A | 11/1983 | Cawley |
| 4,440,443 A | 4/1984 | Nordskog |
| 4,444,430 A | 4/1984 | Yoshida et al. |
| 4,452,485 A | 6/1984 | Schuster |
| 4,467,484 A | 8/1984 | Nagatake et al. |
| 4,491,364 A | 1/1985 | Hattori et al. |
| 4,491,365 A | 1/1985 | Murakami |
| 4,518,201 A | 5/1985 | Wahlmann et al. |
| 4,522,445 A | 6/1985 | Göldner et al. |
| 4,541,669 A | 9/1985 | Goldner |
| 4,580,837 A | 4/1986 | Bayley |
| 4,583,255 A | 4/1986 | Mogaki et al. |
| 4,583,781 A | 4/1986 | Hatsutta et al. |
| 4,592,588 A | 6/1986 | Isono et al. |
| 4,609,221 A | 9/1986 | Böttcher |
| 4,616,676 A | 10/1986 | Adams et al. |
| 4,616,874 A | 10/1986 | Pietsch et al. |
| 4,629,248 A | 12/1986 | Mawbey |
| 4,629,253 A | 12/1986 | Williams |
| 4,634,179 A | 1/1987 | Hashimoto et al. |
| 4,655,505 A | 4/1987 | Kashiwamura et al. |
| 4,664,444 A | 5/1987 | Murphy |
| 4,668,014 A | 5/1987 | Boisset |
| 4,693,513 A | 9/1987 | Heath |
| 4,707,027 A | 11/1987 | Horvath et al. |
| 4,711,497 A | 12/1987 | Kazaoka et al. |
| 4,718,723 A | 1/1988 | Bottemiller |
| 4,720,141 A | 1/1988 | Sakamoto et al. |
| 4,720,146 A | 1/1988 | Mawbey et al. |
| 4,726,086 A | 2/1988 | McEvoy |
| 4,752,982 A | 6/1988 | Jones et al. |
| 4,753,479 A | 6/1988 | Hatsutta et al. |
| 4,767,155 A | 8/1988 | Kousaka et al. |
| 4,773,703 A | 9/1988 | Krügener et al. |
| 4,775,185 A | 10/1988 | Scholin et al. |
| 4,781,413 A | 11/1988 | Shumack, Jr. |
| 4,790,592 A | 12/1988 | Busso et al. |
| 4,792,186 A | 12/1988 | Benjamin et al. |
| 4,796,313 A | 1/1989 | DiMatteo et al. |
| 4,822,092 A | 4/1989 | Sweers |
| 4,833,614 A | 5/1989 | Saitoh et al. |
| 4,840,429 A | 6/1989 | Stöckl |
| 4,856,844 A | 8/1989 | Isono |
| 4,858,992 A | 8/1989 | LaSota |
| 4,861,104 A | 8/1989 | Malak |
| 4,884,843 A | 12/1989 | DeRees |
| 4,893,367 A | 1/1990 | Heimreid et al. |
| 4,915,447 A | 4/1990 | Shovar |
| 4,938,529 A | 7/1990 | Fourrey |
| 4,965,899 A | 10/1990 | Sekido et al. |
| 4,966,410 A | 10/1990 | Bishai |
| 4,971,380 A | 11/1990 | Cote et al. |
| 5,013,089 A | 5/1991 | Abu-Isa et al. |
| 5,018,790 A | 5/1991 | Jay |
| 5,020,852 A | 6/1991 | Marion |
| 5,050,930 A | 9/1991 | Schuster et al. |
| 5,054,845 A | 10/1991 | Vogel |
| 5,054,856 A | 10/1991 | Wang |
| 5,067,772 A | 11/1991 | Koa |
| 5,082,326 A | 1/1992 | Sekido et al. |
| 5,096,529 A | 3/1992 | Baker |
| 5,104,189 A | 4/1992 | Hanai et al. |
| 5,108,150 A | 4/1992 | Stas et al. |
| 5,112,018 A | 5/1992 | Wahls |
| 5,120,109 A | 6/1992 | Rangoni |
| 5,127,708 A | 7/1992 | Kishi et al. |
| 5,129,704 A | 7/1992 | Kishi et al. |
| 5,145,232 A | 9/1992 | Dal Monte |
| 5,171,062 A | 12/1992 | Courtois |
| 5,174,526 A | 12/1992 | Kanigowski |
| 5,186,494 A | 2/1993 | Shimose |
| 5,190,348 A | 3/1993 | Colasanti |
| 5,203,608 A | 4/1993 | Tame |
| 5,222,784 A | 6/1993 | Hamelin |
| 5,243,722 A | 9/1993 | Gusakov |
| 5,263,765 A | 11/1993 | Nagashima et al. |
| 5,285,754 A | 2/1994 | Bell |
| 5,318,344 A | 6/1994 | Wang |
| 5,320,409 A | 6/1994 | Katoh et al. |
| 5,323,740 A | 6/1994 | Daily et al. |
| 5,364,164 A | 11/1994 | Kuranami |
| 5,370,443 A | 12/1994 | Maruyama |
| 5,375,569 A | 12/1994 | Santella |
| 5,380,063 A | 1/1995 | Dauphin |
| 5,443,303 A | 8/1995 | Bauer et al. |
| 5,458,365 A | 10/1995 | Rogers et al. |
| 5,518,294 A | 5/1996 | Ligon, Sr. et al. |
| 5,544,942 A | 8/1996 | Vu Khac et al. |
| 5,547,214 A | 8/1996 | Zimmerman, II et al. |
| 5,560,681 A | 10/1996 | Dixon et al. |
| 5,570,716 A | 11/1996 | Kamen et al. |
| 5,588,708 A | 12/1996 | Rykken et al. |
| 5,597,203 A | 1/1997 | Hubbard |
| 5,609,394 A | 3/1997 | Ligon, Sr. et al. |
| 5,647,635 A | 7/1997 | Aumond et al. |
| 5,658,050 A | 8/1997 | Lorbiecki |

(56) References Cited

U.S. PATENT DOCUMENTS

| | | |
|---|---|---|
| 5,662,384 A | 9/1997 | O'Neill et al. |
| 5,678,891 A | 10/1997 | O'Neill et al. |
| 5,681,084 A | 10/1997 | Yoneda |
| 5,690,387 A | 11/1997 | Sarti |
| 5,692,802 A | 12/1997 | Aufrere et al. |
| 5,707,109 A | 1/1998 | Massara et al. |
| 5,738,368 A | 4/1998 | Hammond et al. |
| 5,755,493 A | 5/1998 | Kodaverdian |
| 5,758,924 A | 6/1998 | Vishey |
| 5,769,489 A | 6/1998 | Dellanno |
| 5,772,280 A | 6/1998 | Massara |
| 5,775,778 A | 7/1998 | Riley et al. |
| 5,785,669 A | 7/1998 | Proctor et al. |
| 5,799,971 A | 9/1998 | Asada |
| 5,803,490 A | 9/1998 | Seventko et al. |
| 5,815,393 A | 9/1998 | Chae |
| 5,823,620 A | 10/1998 | Le Caz |
| 5,826,938 A | 10/1998 | Yanase et al. |
| 5,836,648 A | 11/1998 | Karschin et al. |
| 5,860,699 A | 1/1999 | Weeks |
| 5,863,092 A | 1/1999 | Kifer |
| 5,868,450 A | 2/1999 | Hashimoto |
| 5,882,073 A | 3/1999 | Burchi et al. |
| 5,893,609 A | 4/1999 | Schmidt |
| 5,895,070 A | 4/1999 | Crimmins et al. |
| 5,902,014 A | 5/1999 | Dinkel et al. |
| 5,906,586 A | 5/1999 | Graham |
| 5,913,568 A | 6/1999 | Brightbill et al. |
| 5,944,341 A | 8/1999 | Kimura et al. |
| 5,951,039 A | 9/1999 | Severinski et al. |
| 5,967,608 A | 10/1999 | Van Sickle |
| 5,975,629 A | 11/1999 | Lorbiecki |
| 5,975,637 A | 11/1999 | Geuss et al. |
| 5,979,985 A | 11/1999 | Bauer et al. |
| 5,983,940 A | 11/1999 | Smith |
| 5,988,674 A | 11/1999 | Kimura et al. |
| 5,991,256 A | 11/1999 | Nonaka et al. |
| 6,019,387 A | 2/2000 | Jost |
| 6,024,378 A | 2/2000 | Fu |
| 6,024,406 A | 2/2000 | Charras et al. |
| 6,030,040 A | 2/2000 | Schmid et al. |
| 6,050,635 A | 4/2000 | Pajon et al. |
| 6,056,366 A | 5/2000 | Haynes et al. |
| 6,062,642 A | 5/2000 | Sinnhuber et al. |
| 6,068,339 A | 5/2000 | Linzalone |
| 6,079,781 A | 6/2000 | Tilley |
| 6,088,642 A | 7/2000 | Finkelstein et al. |
| 6,106,071 A | 8/2000 | Aebischer et al. |
| 6,106,163 A | 8/2000 | Inana et al. |
| 6,109,690 A | 8/2000 | Wu et al. |
| 6,145,925 A | 11/2000 | Eksin et al. |
| 6,155,593 A | 12/2000 | Kimura et al. |
| 6,158,812 A | 12/2000 | Bonke |
| 6,161,231 A | 12/2000 | Kraft et al. |
| 6,179,379 B1 | 1/2001 | Andersson |
| 6,189,966 B1 | 2/2001 | Faust et al. |
| 6,196,627 B1 | 3/2001 | Faust et al. |
| 6,199,252 B1 | 3/2001 | Masters et al. |
| 6,199,900 B1 | 3/2001 | Zeigler |
| 6,199,951 B1 | 3/2001 | Zeile et al. |
| 6,203,105 B1 | 3/2001 | Rhodes, Jr. |
| 6,206,466 B1 | 3/2001 | Komatsu |
| 6,217,062 B1 | 4/2001 | Breyvogel et al. |
| 6,217,118 B1 | 4/2001 | Heilig |
| 6,220,661 B1 | 4/2001 | Peterson |
| 6,224,150 B1 | 5/2001 | Eksin et al. |
| 6,231,068 B1 | 5/2001 | White, Jr. et al. |
| 6,234,518 B1 | 5/2001 | Ryl et al. |
| 6,273,810 B1 | 8/2001 | Rhodes, Jr. et al. |
| 6,296,308 B1 | 10/2001 | Cosentino et al. |
| 6,302,431 B1 | 10/2001 | Sasaki et al. |
| 6,312,050 B1 | 11/2001 | Eklind |
| 6,341,797 B1 | 1/2002 | Seo |
| 6,349,993 B1 | 2/2002 | Walsh |
| 6,352,304 B1 | 3/2002 | Sorgenfrei |
| 6,352,310 B1 | 3/2002 | Schmidt et al. |
| 6,357,066 B1 | 3/2002 | Pierce |
| 6,357,789 B1 | 3/2002 | Harada et al. |
| 6,357,827 B1 | 3/2002 | Brightbill et al. |
| 6,364,414 B1 | 4/2002 | Specht |
| 6,375,269 B1 | 4/2002 | Maeda et al. |
| 6,382,720 B1 | 5/2002 | Franklin et al. |
| 6,386,577 B1 | 5/2002 | Kan et al. |
| 6,390,557 B1 | 5/2002 | Asano |
| 6,394,525 B1 | 5/2002 | Seibold |
| 6,394,546 B1 | 5/2002 | Knoblock et al. |
| 6,398,299 B1 | 6/2002 | Angerer et al. |
| 6,398,306 B1 | 6/2002 | Mack |
| 6,419,317 B1 | 7/2002 | Westrich et al. |
| 6,425,602 B1 | 7/2002 | Al-Amin et al. |
| 6,431,734 B1 | 8/2002 | Curry |
| 6,439,597 B1 | 8/2002 | Harada et al. |
| 6,450,571 B1 | 9/2002 | Canni et al. |
| 6,454,353 B1 | 9/2002 | Knaus |
| 6,457,741 B2 | 10/2002 | Seki et al. |
| 6,474,733 B1 | 11/2002 | Heilig et al. |
| 6,523,892 B1 | 2/2003 | Kage et al. |
| 6,523,902 B2 | 2/2003 | Robinson |
| 6,530,622 B1 | 3/2003 | Ekern et al. |
| 6,550,856 B1 | 4/2003 | Ganser et al. |
| 6,554,365 B2 | 4/2003 | Karschin et al. |
| 6,557,887 B2 | 5/2003 | Wohllebe |
| 6,561,540 B1 | 5/2003 | Hasegawa et al. |
| 6,565,150 B2 | 5/2003 | Fischer et al. |
| 6,565,153 B2 | 5/2003 | Hensel et al. |
| 6,568,754 B1 | 5/2003 | Norton et al. |
| 6,578,911 B2 | 6/2003 | Harada et al. |
| 6,588,838 B1 | 7/2003 | Dick, Jr. et al. |
| 6,612,610 B1 | 9/2003 | Aoki et al. |
| 6,616,177 B2 | 9/2003 | Thomas et al. |
| 6,619,605 B2 | 9/2003 | Lambert |
| 6,619,737 B2 | 9/2003 | Kunkel et al. |
| 6,629,715 B2 | 10/2003 | Oh et al. |
| 6,637,818 B2 | 10/2003 | Williams |
| 6,672,666 B2 | 1/2004 | Stiller et al. |
| 6,682,059 B1 | 1/2004 | Daniels et al. |
| 6,682,140 B2 | 1/2004 | Minuth et al. |
| 6,695,406 B2 | 2/2004 | Plant |
| 6,698,832 B2 | 3/2004 | Boudinot |
| 6,719,373 B2 | 4/2004 | Zimmermann |
| 6,726,280 B1 | 4/2004 | Liao |
| 6,733,064 B2 | 5/2004 | Fox et al. |
| 6,736,452 B2 | 5/2004 | Aoki et al. |
| 6,746,077 B2 | 6/2004 | Klukowski |
| 6,758,522 B2 | 7/2004 | Ligon, Sr. et al. |
| 6,779,560 B1 | 8/2004 | Reis |
| 6,786,542 B1 | 9/2004 | Nuzzarello |
| 6,802,563 B1 | 10/2004 | Mysliwiec et al. |
| 6,808,230 B2 | 10/2004 | Buss et al. |
| 6,811,219 B2 | 11/2004 | Hudswell et al. |
| 6,820,640 B2 | 11/2004 | Hand et al. |
| 6,820,930 B2 | 11/2004 | Dellanno |
| 6,824,212 B2 | 11/2004 | Malsch et al. |
| 6,848,742 B1 | 2/2005 | Aoki et al. |
| 6,854,869 B1 | 2/2005 | Fernandez |
| 6,860,559 B2 | 3/2005 | Schuster, Sr. et al. |
| 6,860,564 B2 | 3/2005 | Reed et al. |
| 6,866,339 B2 | 3/2005 | Itoh |
| 6,869,140 B2 | 3/2005 | White et al. |
| 6,890,029 B2 | 5/2005 | Svantesson |
| 6,890,030 B2 | 5/2005 | Wilkerson et al. |
| 6,899,399 B2 | 5/2005 | Ali et al. |
| 6,908,151 B2 | 6/2005 | Meeker et al. |
| 6,912,748 B2 | 7/2005 | VanSickle |
| 6,938,953 B2 | 9/2005 | Håland et al. |
| 6,955,399 B2 | 10/2005 | Hong |
| 6,962,392 B2 | 11/2005 | O'Connor |
| 6,988,770 B2 | 1/2006 | Witchie |
| 6,991,289 B2 | 1/2006 | House |
| 6,997,473 B2 | 2/2006 | Tanase et al. |
| 7,025,423 B2 | 4/2006 | Fujita et al. |
| 7,040,699 B2 | 5/2006 | Curran et al. |
| 7,055,904 B2 | 6/2006 | Skelly et al. |
| 7,059,678 B1 | 6/2006 | Taylor |

(56) References Cited

U.S. PATENT DOCUMENTS

| | | |
|---|---|---|
| 7,072,764 B2 | 7/2006 | Donath et al. |
| 7,093,898 B2 | 8/2006 | Ladron De Guevara |
| 7,100,978 B2 | 9/2006 | Ekern et al. |
| 7,100,992 B2 | 9/2006 | Bargheer et al. |
| 7,108,322 B2 | 9/2006 | Erker |
| 7,111,901 B2 | 9/2006 | Schlierf et al. |
| 7,125,077 B2 | 10/2006 | Frank |
| 7,131,694 B1 | 11/2006 | Buffa |
| 7,131,756 B2 | 11/2006 | Leslie et al. |
| 7,134,686 B2 | 11/2006 | Tracht et al. |
| 7,140,682 B2 | 11/2006 | Jaeger et al. |
| 7,152,920 B2 | 12/2006 | Sugiyama et al. |
| 7,159,934 B2 | 1/2007 | Farquhar et al. |
| 7,159,938 B1 | 1/2007 | Shiraishi |
| 7,185,950 B2 | 3/2007 | Pettersson et al. |
| 7,195,274 B2 | 3/2007 | Tracht |
| 7,195,277 B2 | 3/2007 | Tracht et al. |
| 7,213,876 B2 | 5/2007 | Stoewe |
| 7,213,883 B2 | 5/2007 | Charnitski |
| 7,216,915 B2 | 5/2007 | Kämmerer et al. |
| 7,229,118 B2 | 6/2007 | Saberan et al. |
| 7,229,129 B2 | 6/2007 | White et al. |
| 7,234,771 B2 | 6/2007 | Nakhla |
| 7,261,371 B2 | 8/2007 | Thunissen et al. |
| 7,267,363 B2 | 9/2007 | Tredez |
| 7,284,768 B2 | 10/2007 | Tracht |
| 7,290,791 B2 | 11/2007 | Tracht |
| 7,293,831 B2 | 11/2007 | Greene |
| 7,311,681 B1 | 12/2007 | Vaccarella |
| 7,316,215 B1 | 1/2008 | Nino et al. |
| 7,322,651 B2 | 1/2008 | Makhsous et al. |
| 7,325,878 B1 | 2/2008 | Dehli |
| 7,341,309 B2 | 3/2008 | Penley et al. |
| 7,344,189 B2 | 3/2008 | Reed et al. |
| 7,347,444 B2 | 3/2008 | Wheelwright |
| 7,350,803 B2 | 4/2008 | Abramczyk et al. |
| 7,350,859 B2 | 4/2008 | Klukowski |
| 7,350,865 B2 | 4/2008 | Pearse |
| 7,357,412 B2 | 4/2008 | Tracht et al. |
| 7,357,454 B2 | 4/2008 | Schiener et al. |
| 7,382,240 B2 | 6/2008 | Egelhaaf |
| 7,387,339 B2 | 6/2008 | Bykov et al. |
| 7,393,005 B2 | 7/2008 | Inazu et al. |
| 7,401,852 B2 | 7/2008 | Humer et al. |
| 7,413,253 B2 | 8/2008 | Karlberg |
| 7,425,034 B2 | 9/2008 | Bajic et al. |
| 7,441,797 B2 | 10/2008 | Tracht et al. |
| 7,441,838 B2 | 10/2008 | Patwardhan |
| 7,445,292 B2 | 11/2008 | Moule |
| 7,467,823 B2 | 12/2008 | Hartwich |
| 7,478,869 B2 | 1/2009 | Lazanja et al. |
| 7,481,489 B2 | 1/2009 | Demick |
| 7,488,040 B2 | 2/2009 | Dozsa-Farkas |
| 7,506,924 B2 | 3/2009 | Bargheer et al. |
| 7,506,938 B2 | 3/2009 | Brennan et al. |
| 7,517,015 B2 | 4/2009 | Terada et al. |
| 7,517,024 B2 | 4/2009 | Cvek |
| 7,523,888 B2 | 4/2009 | Ferry et al. |
| 7,530,633 B2 | 5/2009 | Yokota et al. |
| 7,540,529 B2 | 6/2009 | Tracht et al. |
| 7,543,888 B2 | 6/2009 | Kuno |
| 7,547,068 B2 | 6/2009 | Davis |
| 7,562,934 B2 | 7/2009 | Swan et al. |
| 7,578,552 B2 | 8/2009 | Bajic et al. |
| 7,578,554 B2 | 8/2009 | Lee et al. |
| 7,597,398 B2 | 10/2009 | Lindsay |
| 7,604,294 B2 | 10/2009 | Jane Santamaria |
| 7,611,199 B2 | 11/2009 | Michalak et al. |
| 7,614,693 B2 | 11/2009 | Ito |
| 7,637,568 B2 | 12/2009 | Meeker et al. |
| 7,640,090 B2 | 12/2009 | Uchida et al. |
| 7,641,281 B2 | 1/2010 | Grimm |
| 7,668,329 B2 | 2/2010 | Matsuhashi |
| 7,669,888 B2 | 3/2010 | Sato et al. |
| 7,669,925 B2 | 3/2010 | Beck et al. |
| 7,669,928 B2 | 3/2010 | Snyder |
| 7,669,929 B2 | 3/2010 | Simon et al. |
| 7,677,594 B2 | 3/2010 | Hazlewood et al. |
| 7,677,598 B1 | 3/2010 | Ryan et al. |
| 7,699,339 B2 | 4/2010 | Jang et al. |
| 7,712,833 B2 | 5/2010 | Ueda |
| 7,717,459 B2 | 5/2010 | Bostrom et al. |
| 7,726,733 B2 | 6/2010 | Balser et al. |
| 7,735,932 B2 | 6/2010 | Lazanja et al. |
| 7,752,720 B2 | 7/2010 | Smith |
| 7,753,451 B2 | 7/2010 | Maebert et al. |
| 7,775,552 B2 | 8/2010 | Breuninger et al. |
| 7,775,602 B2 | 8/2010 | Lazanja et al. |
| 7,784,819 B2 | 8/2010 | Lawall et al. |
| 7,784,863 B2 | 8/2010 | Fallen |
| 7,793,973 B2 | 9/2010 | Sato et al. |
| 7,794,012 B2 | 9/2010 | Szablewski |
| 7,798,570 B2 | 9/2010 | Kwiecinski et al. |
| 7,802,809 B2 | 9/2010 | Ryan et al. |
| 7,802,843 B2 | 9/2010 | Andersson et al. |
| 7,810,969 B2 | 10/2010 | Blackmore et al. |
| 7,819,470 B2 | 10/2010 | Humer et al. |
| 7,819,480 B2 | 10/2010 | Asbury et al. |
| 7,823,971 B2 | 11/2010 | Humer et al. |
| 7,845,729 B2 | 12/2010 | Yamada et al. |
| 7,850,235 B2 | 12/2010 | Veine et al. |
| 7,850,247 B2 | 12/2010 | Stauske et al. |
| 7,857,381 B2 | 12/2010 | Humer et al. |
| 7,862,113 B2 | 1/2011 | Knoll |
| 7,862,117 B2 | 1/2011 | Hutchinson et al. |
| 7,866,689 B2 | 1/2011 | Saberan |
| 7,871,126 B2 | 1/2011 | Becker et al. |
| 7,871,129 B2 | 1/2011 | Boes et al. |
| 7,878,535 B2 | 2/2011 | Rose et al. |
| 7,878,596 B2 | 2/2011 | Brunner et al. |
| 7,887,094 B2 | 2/2011 | Sakaida |
| 7,891,701 B2 | 2/2011 | Tracht et al. |
| 7,909,360 B2 | 3/2011 | Marriott et al. |
| 7,909,401 B2 | 3/2011 | Hofmann et al. |
| 7,909,403 B2 | 3/2011 | Lawall et al. |
| 7,926,871 B2 | 4/2011 | Meixner et al. |
| 7,926,872 B2 | 4/2011 | Chida et al. |
| 7,931,294 B2 | 4/2011 | Okada et al. |
| 7,931,330 B2 | 4/2011 | Itou et al. |
| 7,938,440 B2 | 5/2011 | Kataoka et al. |
| 7,946,649 B2 | 5/2011 | Galbreath et al. |
| 7,959,225 B2 | 6/2011 | Humer et al. |
| 7,959,226 B2 | 6/2011 | Hattori et al. |
| 7,963,553 B2 | 6/2011 | Huynh et al. |
| 7,963,595 B2 | 6/2011 | Ito et al. |
| 7,963,600 B2 | 6/2011 | Alexander et al. |
| 7,966,835 B2 | 6/2011 | Petrovski |
| 7,967,379 B2 | 6/2011 | Walters et al. |
| 7,971,931 B2 | 7/2011 | Lazanja et al. |
| 7,971,937 B2 | 7/2011 | Ishii et al. |
| 3,011,728 A1 | 9/2011 | Kohl et al. |
| 8,011,726 B2 | 9/2011 | Omori et al. |
| 8,016,355 B2 | 9/2011 | Ito et al. |
| 8,029,055 B2 | 10/2011 | Hartlaub |
| 8,038,222 B2 | 10/2011 | Lein et al. |
| 8,056,923 B2 | 11/2011 | Shimono |
| 8,075,053 B2 | 12/2011 | Tracht et al. |
| 8,100,471 B2 | 1/2012 | Lawall et al. |
| 8,109,569 B2 | 2/2012 | Mitchell |
| 8,111,147 B2 | 2/2012 | Litkouhi |
| 8,113,539 B2 | 2/2012 | Paruszkiewicz et al. |
| 8,123,246 B2 | 2/2012 | Gilbert et al. |
| 8,126,615 B2 | 2/2012 | McMillen et al. |
| D655,393 S | 3/2012 | Whitaker |
| 8,128,167 B2 | 3/2012 | Zhong et al. |
| 8,141,945 B2 | 3/2012 | Akaike et al. |
| 8,162,391 B2 | 4/2012 | Lazanja et al. |
| 8,162,392 B2 | 4/2012 | Humer et al. |
| 8,162,397 B2 | 4/2012 | Booth et al. |
| 8,167,370 B2 | 5/2012 | Arakawa et al. |
| 8,167,376 B2 | 5/2012 | Song |
| 8,177,256 B2 | 5/2012 | Smith et al. |
| 8,196,887 B2 | 6/2012 | Dahlbacka et al. |
| 8,201,883 B2 | 6/2012 | Wuerstlein et al. |

(56) References Cited

U.S. PATENT DOCUMENTS

| | | |
|---|---|---|
| 8,210,568 B2 | 7/2012 | Ryden et al. |
| 8,210,605 B2 | 7/2012 | Hough et al. |
| 8,210,611 B2 | 7/2012 | Aldrich et al. |
| 8,226,113 B2 | 7/2012 | Yamashita |
| 8,226,165 B2 | 7/2012 | Mizoi |
| 8,231,138 B2 | 7/2012 | Sadr et al. |
| 8,240,758 B2 | 8/2012 | Combest |
| 8,251,396 B2 | 8/2012 | Zothke et al. |
| 8,297,708 B2 | 10/2012 | Mizobata et al. |
| 8,328,227 B2 | 12/2012 | Shimono |
| 8,328,231 B2 | 12/2012 | Nakamura et al. |
| 8,336,910 B1 | 12/2012 | Kalisz et al. |
| 8,342,607 B2 | 1/2013 | Hofmann et al. |
| 8,348,338 B2 | 1/2013 | Galecka et al. |
| 8,360,517 B2 | 1/2013 | Lazanja et al. |
| 8,360,530 B2 | 1/2013 | Onoda et al. |
| 8,371,655 B2 | 2/2013 | Nonomiya |
| 8,388,061 B2 | 3/2013 | Saito et al. |
| 8,397,688 B2 | 3/2013 | Cunningham |
| 8,403,410 B1 | 3/2013 | Pinger et al. |
| 8,408,646 B2 | 4/2013 | Harper et al. |
| 8,447,473 B2 | 5/2013 | Sugiyama et al. |
| 8,469,395 B2 | 6/2013 | Richez et al. |
| 8,474,778 B2 | 7/2013 | Jacobson |
| 8,474,917 B2 * | 7/2013 | Line ............... B60N 2/5825 297/188.04 |
| 8,511,748 B2 | 8/2013 | McLeod et al. |
| 8,516,842 B2 | 8/2013 | Petrovski |
| 8,534,760 B2 | 9/2013 | Kotz |
| 8,540,318 B2 | 9/2013 | Folkert et al. |
| 8,585,144 B2 | 11/2013 | Huttenhuis |
| 8,590,978 B2 | 11/2013 | Jaranson et al. |
| 8,602,493 B1 | 12/2013 | Chen et al. |
| 8,657,378 B2 | 2/2014 | Kunert et al. |
| 8,678,500 B2 | 3/2014 | Lem et al. |
| 8,696,067 B2 | 4/2014 | Galbreath et al. |
| 8,727,374 B1 | 5/2014 | Line et al. |
| 8,752,894 B2 | 6/2014 | Trimbom et al. |
| 8,794,707 B2 | 8/2014 | Bocsanyi et al. |
| 8,807,594 B2 | 8/2014 | Mizobata |
| 8,827,371 B2 | 9/2014 | Brncick et al. |
| 8,899,683 B2 | 12/2014 | Ito |
| 8,905,431 B1 | 12/2014 | Line et al. |
| 8,967,663 B2 | 3/2015 | Seki et al. |
| 8,979,204 B2 | 3/2015 | Awata et al. |
| 9,096,157 B2 | 8/2015 | Line et al. |
| 9,126,504 B2 | 9/2015 | Line et al. |
| 9,126,508 B2 | 9/2015 | Line et al. |
| 9,193,289 B2 | 11/2015 | Takahashi et al. |
| 2001/0011812 A1 | 8/2001 | Seki et al. |
| 2002/0096915 A1 | 7/2002 | Haupt et al. |
| 2002/0113473 A1 | 8/2002 | Knaus |
| 2002/0145512 A1 | 10/2002 | Sleichter, III et al. |
| 2003/0023363 A1 | 1/2003 | Katz et al. |
| 2003/0025370 A1 | 2/2003 | Hensel et al. |
| 2003/0038517 A1 | 2/2003 | Moran et al. |
| 2003/0137178 A1 | 7/2003 | Craft et al. |
| 2003/0213105 A1 | 11/2003 | Bednarski |
| 2004/0012237 A1 | 1/2004 | Horiki et al. |
| 2004/0084937 A1 | 5/2004 | Berta |
| 2004/0108760 A1 | 6/2004 | McMillen |
| 2004/0129585 A1 | 7/2004 | Ballantine et al. |
| 2004/0144349 A1 | 7/2004 | Wampula et al. |
| 2004/0183351 A1 | 9/2004 | Johnson et al. |
| 2004/0195870 A1 | 10/2004 | Bohlender et al. |
| 2004/0212589 A1 | 10/2004 | Hall et al. |
| 2005/0035642 A1 | 2/2005 | Hake et al. |
| 2005/0077762 A1 | 4/2005 | Kraemer et al. |
| 2005/0082895 A1 | 4/2005 | Kimmig |
| 2005/0127734 A1 | 6/2005 | Veine et al. |
| 2005/0140193 A1 | 6/2005 | Skelly et al. |
| 2005/0179287 A1 | 8/2005 | Hankins |
| 2005/0179291 A1 | 8/2005 | Brodeur |
| 2005/0184569 A1 | 8/2005 | Penley et al. |
| 2005/0189752 A1 | 9/2005 | Itoga et al. |
| 2005/0200166 A1 | 9/2005 | Noh |
| 2005/0248189 A1 | 11/2005 | Prasatek et al. |
| 2005/0253429 A1 | 11/2005 | Veine et al. |
| 2005/0258624 A1 | 11/2005 | Abraham et al. |
| 2006/0043777 A1 | 3/2006 | Friedman et al. |
| 2006/0113751 A1 | 6/2006 | Tracht et al. |
| 2006/0113762 A1 | 6/2006 | Tracht et al. |
| 2006/0113765 A1 | 6/2006 | Tracht |
| 2006/0152062 A1 | 7/2006 | Archambault et al. |
| 2006/0155429 A1 | 7/2006 | Boone et al. |
| 2006/0214487 A1 | 9/2006 | Holdampf et al. |
| 2006/0220434 A1 | 10/2006 | Schulz et al. |
| 2006/0244301 A1 | 11/2006 | Jeffries |
| 2007/0029853 A1 | 2/2007 | Forgatsch et al. |
| 2007/0090673 A1 | 4/2007 | Ito |
| 2007/0118259 A1 | 5/2007 | Chernoff et al. |
| 2007/0120401 A1 | 5/2007 | Minuth et al. |
| 2007/0138844 A1 | 6/2007 | Kim |
| 2007/0170707 A1 | 7/2007 | Sato et al. |
| 2007/0200398 A1 | 8/2007 | Wolas et al. |
| 2007/0241593 A1 | 10/2007 | Woerner |
| 2007/0296194 A1 | 12/2007 | Ridgway et al. |
| 2008/0036258 A1 | 2/2008 | Holdampf et al. |
| 2008/0067850 A1 | 3/2008 | Stenstrom et al. |
| 2008/0122241 A1 | 5/2008 | Blackmore et al. |
| 2008/0136240 A1 | 6/2008 | Matthews et al. |
| 2008/0157577 A1 | 7/2008 | Lindsay |
| 2008/0174159 A1 | 7/2008 | Kojima et al. |
| 2008/0231099 A1 | 9/2008 | Szczepkowski et al. |
| 2008/0252111 A1 | 10/2008 | Rothkop et al. |
| 2009/0039690 A1 | 2/2009 | Simon et al. |
| 2009/0066122 A1 | 3/2009 | Minuth et al. |
| 2009/0085383 A1 | 4/2009 | Hicks et al. |
| 2009/0102255 A1 | 4/2009 | D'Agostini et al. |
| 2009/0152909 A1 | 6/2009 | Andersson |
| 2009/0160167 A1 | 6/2009 | Itoga |
| 2009/0165263 A1 | 7/2009 | Smith |
| 2009/0195041 A1 | 8/2009 | Ito et al. |
| 2009/0224584 A1 | 9/2009 | Lawall et al. |
| 2009/0302660 A1 | 12/2009 | Karlberg et al. |
| 2009/0315372 A1 | 12/2009 | Tracht |
| 2009/0322124 A1 | 12/2009 | Barkow et al. |
| 2010/0007122 A1 | 1/2010 | Clauser et al. |
| 2010/0026066 A1 | 2/2010 | Graber et al. |
| 2010/0038937 A1 | 2/2010 | Andersson et al. |
| 2010/0102599 A1 | 4/2010 | Itou et al. |
| 2010/0109397 A1 | 5/2010 | Bandurski et al. |
| 2010/0109401 A1 | 5/2010 | Booth et al. |
| 2010/0117414 A1 | 5/2010 | Hwang et al. |
| 2010/0133794 A1 | 6/2010 | Tracht et al. |
| 2010/0140986 A1 | 6/2010 | Sawada |
| 2010/0140992 A1 | 6/2010 | Yamaguchi |
| 2010/0148546 A1 | 6/2010 | Demontis et al. |
| 2010/0148948 A1 | 6/2010 | Murphy et al. |
| 2010/0171346 A1 | 7/2010 | Laframboise et al. |
| 2010/0187881 A1 | 7/2010 | Fujita et al. |
| 2010/0201167 A1 | 8/2010 | Wieclawski |
| 2010/0207438 A1 | 8/2010 | Inoue et al. |
| 2010/0207443 A1 | 8/2010 | Brncick |
| 2010/0231013 A1 | 9/2010 | Schlenker |
| 2010/0270840 A1 | 10/2010 | Tanaka et al. |
| 2010/0283229 A1 | 11/2010 | Feller et al. |
| 2010/0286867 A1 | 11/2010 | Bergholz et al. |
| 2010/0301650 A1 | 12/2010 | Hong |
| 2010/0319796 A1 | 12/2010 | Whitaker |
| 2010/0320816 A1 | 12/2010 | Michalak |
| 2010/0327636 A1 | 12/2010 | Stoll et al. |
| 2011/0018498 A1 | 1/2011 | Soar |
| 2011/0055720 A1 | 3/2011 | Potter et al. |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Brncick et al. |
| 2011/0133525 A1 | 6/2011 | Oota |
| 2011/0155084 A1 | 6/2011 | Sargeant |
| 2011/0163574 A1 | 7/2011 | Tame et al. |
| 2011/0163583 A1 | 7/2011 | Zhong et al. |

(56) References Cited

U.S. PATENT DOCUMENTS

| | | |
|---|---|---|
| 2011/0186560 A1 | 8/2011 | Kennedy et al. |
| 2011/0187174 A1 | 8/2011 | Tscherbner |
| 2011/0199200 A1 | 8/2011 | Lueke et al. |
| 2011/0215200 A1 | 9/2011 | Mejuhas |
| 2011/0248532 A1 | 10/2011 | Kim et al. |
| 2011/0254335 A1 | 10/2011 | Pradier et al. |
| 2011/0260506 A1 | 10/2011 | Kuno |
| 2011/0260509 A1 | 10/2011 | Siu |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0285194 A1 | 11/2011 | Marom |
| 2011/0298261 A1 | 12/2011 | Holt et al. |
| 2011/0309604 A1 | 12/2011 | Moore et al. |
| 2012/0013161 A1 | 1/2012 | Adams et al. |
| 2012/0032478 A1 | 2/2012 | Friderich et al. |
| 2012/0032486 A1 | 2/2012 | Baker et al. |
| 2012/0037754 A1 | 2/2012 | Kladde |
| 2012/0041648 A1 | 2/2012 | Yamaguchi et al. |
| 2012/0043791 A1 | 2/2012 | Kojima |
| 2012/0049597 A1 | 3/2012 | Brewer et al. |
| 2012/0063081 A1 | 3/2012 | Grunwald |
| 2012/0080914 A1 | 4/2012 | Wang |
| 2012/0081234 A1 | 4/2012 | Shaffer et al. |
| 2012/0081544 A1 | 4/2012 | Wee |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0112515 A1 | 5/2012 | Labish |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0161481 A1 | 6/2012 | Tache et al. |
| 2012/0162891 A1 | 6/2012 | Tranchina et al. |
| 2012/0167845 A1 | 7/2012 | Sands et al. |
| 2012/0175924 A1 | 7/2012 | Festag et al. |
| 2012/0187729 A1 | 7/2012 | Fukawatase et al. |
| 2012/0187731 A1 | 7/2012 | Guadagno |
| 2012/0222900 A1 | 9/2012 | Rodney et al. |
| 2012/0248833 A1 | 10/2012 | Hontz et al. |
| 2012/0248839 A1 | 10/2012 | Fujita et al. |
| 2012/0261974 A1 | 10/2012 | Yoshizawa et al. |
| 2012/0267878 A1 | 10/2012 | Kalisz et al. |
| 2012/0299342 A1 | 11/2012 | Mizobata |
| 2013/0015643 A1 | 1/2013 | Gorman et al. |
| 2013/0076092 A1 | 3/2013 | Kulkarni et al. |
| 2013/0119646 A1 | 5/2013 | Tracht |
| 2013/0119715 A1 | 5/2013 | Medoro et al. |
| 2013/0119723 A1 | 5/2013 | Nitsuma |
| 2013/0119724 A1 | 5/2013 | Adachi et al. |
| 2013/0119741 A1 | 5/2013 | Medoro et al. |
| 2013/0134749 A1 | 5/2013 | Awata et al. |
| 2013/0181492 A1 | 7/2013 | Prescott et al. |
| 2013/0220877 A1 | 8/2013 | Stern |
| 2013/0241255 A1 | 9/2013 | Kulkarni et al. |
| 2013/0285426 A1 | 10/2013 | Arant et al. |
| 2013/0320730 A1 | 12/2013 | Aselage |
| 2013/0320742 A1* | 12/2013 | Murolo .................. B60N 2/68 297/452.18 |
| 2013/0341975 A1 | 12/2013 | Schneider et al. |
| 2013/0342366 A1 | 12/2013 | Kiefer et al. |
| 2013/0343072 A1 | 12/2013 | Ehrmann et al. |
| 2014/0032043 A1 | 1/2014 | Line et al. |
| 2014/0042781 A1 | 2/2014 | Reeves |
| 2014/0054944 A1 | 2/2014 | Locke et al. |
| 2014/0058305 A1 | 2/2014 | Batterson et al. |
| 2014/0062147 A1 | 3/2014 | Bashir et al. |
| 2014/0070594 A1 | 3/2014 | Awata et al. |
| 2014/0077565 A1 | 3/2014 | Baumgarten et al. |
| 2014/0135991 A1 | 5/2014 | Summer et al. |
| 2014/0139979 A1 | 5/2014 | Blazic |
| 2014/0152057 A1 | 6/2014 | Truant et al. |
| 2014/0167465 A1 | 6/2014 | Sakata et al. |
| 2014/0180181 A1 | 6/2014 | von Oepen et al. |
| 2014/0203606 A1 | 7/2014 | Line et al. |
| 2014/0203610 A1 | 7/2014 | Line et al. |
| 2014/0203617 A1 | 7/2014 | Line et al. |
| 2014/0265506 A1 | 9/2014 | McMillen et al. |
| 2014/0300145 A1 | 10/2014 | Beroth et al. |
| 2014/0300167 A1 | 10/2014 | Datta |
| 2014/0361571 A1 | 12/2014 | Line et al. |
| 2014/0375100 A1 | 12/2014 | Reese |
| 2015/0108816 A1 | 4/2015 | Dry et al. |
| 2015/0145313 A1* | 5/2015 | Lee .................. B60N 2/682 297/452.18 |
| 2015/0157481 A1 | 6/2015 | Whitaker et al. |
| 2015/0157482 A1 | 6/2015 | Batterson et al. |
| 2015/0165935 A1 | 6/2015 | Sachs et al. |
| 2015/0283970 A1 | 10/2015 | Line et al. |
| 2015/0314501 A1* | 11/2015 | Maslakow ......... B64D 11/0649 297/452.18 |
| 2015/0321591 A1* | 11/2015 | Kuhley ................. B60N 2/682 264/446 |

FOREIGN PATENT DOCUMENTS

| | | |
|---|---|---|
| DE | 3115269 A1 | 10/1982 |
| DE | 3119867 A1 | 12/1982 |
| DE | 3139945 A1 | 4/1983 |
| DE | 3519351 A1 | 12/1986 |
| DE | 3735428 A1 | 5/1989 |
| DE | 3841688 A1 | 6/1990 |
| DE | 4403071 A1 | 8/1994 |
| DE | 9415511 U1 | 11/1994 |
| DE | 19857386 A1 | 6/2000 |
| DE | 10106238 A1 | 9/2002 |
| DE | 10201836 A1 | 8/2003 |
| DE | 10331612 A1 | 2/2005 |
| DE | 102004037069 A1 | 4/2005 |
| DE | 102006061226 A1 | 6/2008 |
| DE | 102010024180 A1 | 2/2011 |
| DE | 102010024544 A1 | 12/2011 |
| DE | 102012006074 A1 | 11/2012 |
| DE | 102012011226 A1 | 12/2012 |
| EP | 0174884 B1 | 9/1987 |
| EP | 0386890 A1 | 9/1990 |
| EP | 0518830 A1 | 12/1992 |
| EP | 0627339 A1 | 12/1994 |
| EP | 0670240 A1 | 9/1995 |
| EP | 0754590 A2 | 1/1997 |
| EP | 0594526 B1 | 9/1997 |
| EP | 0921033 A2 | 6/1999 |
| EP | 1077154 A2 | 2/2001 |
| EP | 0926969 B1 | 1/2002 |
| EP | 1266794 A2 | 12/2002 |
| EP | 1325838 A1 | 7/2003 |
| EP | 1462318 A1 | 9/2004 |
| EP | 1123834 B1 | 10/2004 |
| EP | 1002693 B1 | 9/2005 |
| EP | 1050429 B1 | 10/2005 |
| EP | 1084901 B1 | 6/2006 |
| EP | 1674333 A1 | 6/2006 |
| EP | 1674333 B1 | 8/2007 |
| EP | 1839932 A2 | 10/2007 |
| EP | 1950085 A3 | 12/2008 |
| EP | 1329356 B1 | 11/2009 |
| EP | 2289732 A1 | 3/2011 |
| EP | 2423040 A2 | 2/2012 |
| EP | 2534979 A1 | 12/2012 |
| EP | 2565070 A2 | 3/2013 |
| EP | 2574498 A1 | 4/2013 |
| EP | 2743124 A1 | 6/2014 |
| ES | 2107995 T1 | 12/1997 |
| FR | 2562003 A1 | 10/1985 |
| FR | 2875753 A1 | 3/2006 |
| GB | 1260717 A | 1/1972 |
| GB | 2011254 A | 7/1979 |
| GB | 2403139 A | 12/2004 |
| GB | 2430420 B | 3/2009 |
| JP | 61036029 A | 2/1986 |
| JP | 05115331 A | 5/1993 |

(56) References Cited

FOREIGN PATENT DOCUMENTS

| JP | 2008189176 A | 8/2008 |
|---|---|---|
| JP | 2009096422 A | 5/2009 |
| JP | 201178557 A | 4/2011 |
| JP | 2011098588 A | 5/2011 |
| JP | 2011251573 A | 12/2011 |
| KR | 20050110301 A | 11/2005 |
| KR | 20080066428 A | 7/2008 |
| KR | 20100019390 A | 2/2010 |
| KR | 1020110051692 A | 5/2011 |
| KR | 101180702 B1 | 9/2012 |
| WO | WO9511818 A1 | 5/1995 |
| WO | 9534449 A1 | 12/1995 |
| WO | 9815435 A1 | 4/1998 |
| WO | 9831992 A1 | 7/1998 |
| WO | 9919708 | 4/1999 |
| WO | WO9958022 A1 | 11/1999 |
| WO | 0021797 A1 | 4/2000 |
| WO | 0144026 A1 | 6/2001 |
| WO | WO2006131189 A1 | 12/2006 |
| WO | 2007009893 A2 | 1/2007 |
| WO | WO2007028015 A2 | 3/2007 |
| WO | 2008019981 A1 | 2/2008 |
| WO | WO2008073285 A1 | 6/2008 |
| WO | 2010096307 A1 | 8/2010 |
| WO | WO2011021952 A1 | 2/2011 |
| WO | 2011068684 A1 | 6/2011 |
| WO | WO2012008904 A1 | 1/2012 |
| WO | 2012138699 A1 | 10/2012 |
| WO | 2013040085 A2 | 3/2013 |
| WO | 2013070905 A1 | 5/2013 |
| WO | 2013101644 A1 | 7/2013 |
| WO | 2014047417 A1 | 3/2014 |

OTHER PUBLICATIONS

Richard A Lowry, United States Patent and Trademark Office, Non Final Office Communication re U.S. Appl. No. 13/748,847, dated Sep. 10, 2014, 14 pages.
David E Allred, United States Patent and Trademark Office, Non Final Office Communication re U.S. Appl. No. 13/748,857, dated Aug. 25, 2014, 13 pages.
Timothy J Brindley, United States Patent and Trademark Office, Final Office Communication re U.S. Appl. No. 13/749,568, dated Mar. 26, 2015, 9 pages.
Timothy J Brindley, United States Patent and Trademark Office, Non Final Office Communication re U.S. Appl. No. 13/749,568, dated Sep. 8, 2014, 9 pages.
Milton Nelson Jr., United States Patent and Trademark Office, Final Office Communication re U.S. Appl. No. 13/749,572, dated Mar. 3, 2015, 13 pages.
Milton Nelson Jr., United States Patent and Trademark Office, Non Final Office Communication re U.S. Appl. No. 13/749,572, dated Sep. 30, 2014, 20 pages.
Nicole T Verley, United States Patent and Trademark Office, Non Final Office Communication re U.S. Appl. No. 13/749,589, dated Oct. 4, 2013, 12 pages.
Timothy J Brindley, United States Patent and Trademark Office, Non Final Office Communication re U.S. Appl. No. 13/749,595, dated Aug. 28, 2014, 10 pages.
Timothy J Brindley, United States Patent and Trademark Office, Final Office Communication re U.S. Appl. No. 13/749,595, dated Jan. 12, 2015, 10 pages.
Timothy J Brindley, United States Patent and Trademark Office, Non Final Office Communication re U.S. Appl. No. 13/749,584, dated Sep. 15, 2014, 9 pages.
Yolanda G Giacoman, United States Patent and Trademark Office, Final Office Communication re U.S. Appl. No. 13/748,862, dated Dec. 30, 2015, 10 pages.
Yolanda G Giacoman, United States Patent and Trademark Office, Non Final Office Communication re U.S. Appl. No. 13/748,862, dated Aug. 13, 2015, 9 pages.
Yolanda G Giacoman, United States Patent and Trademark Office, Final Office Communication re U.S. Appl. No. 13/748,862, dated Mar. 10, 2015, 19 pages.
Yolanda G Giacoman, United States Patent and Trademark Office, Non Final Office Communication re U.S. Appl. No. 13/748,862, dated Sep. 25, 2014, 16 pages.
Milton Nelson Jr., United States Patent and Trademark Office, Non Final Office Communication re U.S. Appl. No. 13/749,602, dated Sep. 19, 2014, 9 pages.
Melissa Ann Black, United States Patent and Trademark Office, Non Final Office Communication re U.S. Appl. No. 13/914,666, dated Mar. 13, 2015, 6 pages.
Philip F Gabler, United States Patent and Trademark Office, Non Final Office Communication re U.S. Appl. No. 14/025,483, dated Dec. 17, 2014, 8 pages.
Philip F Gabler, United States Patent and Trademark Office, Final Office Communication re U.S. Appl. No. 14/025,483, dated Apr. 23, 2015, 10 pages.
Philip F Gabler, United States Patent and Trademark Office, Non Final Office Communication re U.S. Appl. No. 14/025,483, dated Aug. 18, 2015, 14 pages.
Philip F Gabler, United States Patent and Trademark Office, Final Office Communication re U.S. Appl. No. 14/025,483, dated Dec. 18, 2015, 14 pages.
Peter R Brown, United States Patent and Trademark Office, Final Office Communication re U.S. Appl. No. 14/104,780, dated Dec. 1, 2015, 5 pages.
Peter R Brown, United States Patent and Trademark Office, Non Final Office Communication re U.S. Appl. No. 14/104,780, dated Jun. 29, 2015, 9 pages.
Nicole T Verley, United States Patent and Trademark Office, Advisory Action for U.S. Appl. No. 14/056,005, dated Sep. 30, 2015, 3 pages.
Nicole T Verley, United States Patent and Trademark Office, Final Office Communication re U.S. Appl. No. 14/056,005, dated Jun. 10, 2015, 8 pages.
Nicole T Verley, United States Patent and Trademark Office, Non Final Office Communication re U.S. Appl. No. 14/056,005, dated Mar. 2, 2015, 8 pages.
Peter R Brown, United States Patent and Trademark Office, Non Final Office Communication re U.S. Appl. No. 14/056,000, dated Mar. 4, 2015, 7 pages.
Peter R Brown, United States Patent and Trademark Office, Non Final Office Communication re U.S. Appl. No. 14/056,000, dated Oct. 1, 2014, 8 pages.
Philip F Gabler, United States Patent and Trademark Office, Final Office Communication re U.S. Appl. No. 14/076,893, dated Sep. 29, 2015, 13 pages.
Philip F Gabler, United States Patent and Trademark Office, Non Final Office Communication re U.S. Appl. No. 14/076,893, dated Apr. 21, 2015, 12 pages.
David E Allred, United States Patent and Trademark Office, Non Final Office Communication re U.S. Appl. No. 14/063,647, dated Aug. 18, 2015, 19 pages.
Matthew W Ing, United States Patent and Trademark Office, Non Final Office Communication re U.S. Appl. No. 14/609,092, dated Oct. 19, 2015, 11 pages.
Alexander Scott Harrison, United States Patent and Trademark Office, Final Office Communication re U.S. Appl. No. 14/243,027, dated Jan. 20, 2016, 17 pages.
Alexander Scott Harrison, United States Patent and Trademark Office, Non Final Office Communication re U.S. Appl. No. 14/243,027, dated Aug. 13, 2015, 15 pages.
Ryan D Kwiecinski, United States Patent and Trademark Office, Non Final Office Communication re U.S. Appl. No. 14/230,961, dated Dec. 24, 2015, 12 pages.
Philip F Gabler, United States Patent and Trademark Office, Final Office Communication re U.S. Appl. No. 14/257,655, dated Dec. 18, 2015, 10 pages.
Philip F Gabler, United States Patent and Trademark Office, Non Final Office Communication re U.S. Appl. No. 14/257,655, dated Aug. 20, 2015, 10 pages.

(56) References Cited

OTHER PUBLICATIONS

Syed A Islam, United States Patent and Trademark Office, Final Office Communication re U.S. Appl. No. 14/275,368, dated Nov. 13, 2015, 13 pages.
Syed A Islam, United States Patent and Trademark Office, Non Final Office Communication re U.S. Appl. No. 14/275,368, dated May 6, 2015, 10 pages.
Laurie K Cranmer, United States Patent and Trademark Office, Non Final Office Communication re U.S. Appl. No. 14/505,675, dated Aug. 31, 2015, 7 pages.
Rodney Barnett White, United States Patent and Trademark Office, Non Final Office Communication re U.S. Appl. No. 14/600,166, dated Nov. 2, 2015, 7 pages.
Rodney Barnett White, United States Patent and Trademark Office, Final Office Communication re U.S. Appl. No. 14/534,296, dated Dec. 11, 2105, 14 pages.
Rodney Barnett White, United States Patent and Trademark Office, Non Final Office Communication re U.S. Appl. No. 14/534,296, dated Aug. 26, 2015, 13 pages.
Sanjeev Malhotra, United States Patent and Trademark Office, Non Final Office Communication re U.S. Appl. No. 14/534,285, dated Sep. 23, 2015, 14 pages.
Nicole T Verley, United States Patent and Trademark Office, Non Final Office Communication re U.S. Appl. No. 14/635,025, dated Dec. 4, 2015, 8 pages.
M. Grujicic et al., "Seat-cushion and soft-tissue material modeling and a finite element investigation of the seating comfort for passenger-vehicle occupants," Materials and Design 30 (2009) 4273-4285.
"Thigh Support for Tall Drivers," http://cars.about.com/od/infiniti/ig/2009-Infiniti-G37-Coupe-pics/2008-G37-cpe-thigh-support.htm (1 page) [Accessed from the internet Apr. 10, 2013].
Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).
Brose India Automotive Systems, "Adaptive Sensor Controlled Headrest," http://www.indiamart.com/broseindiaautomotivesystems/products.html, Oct. 9, 2012 (12 pages).
eCoustics.Com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.
"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.
"Imola Pro-fit", Cobra, (http://cobra.subesports.com/products/cat/seats/brand/Cobra/prodID/656), Date unknown, 2 pages.
Freedman Seating Company, "Go Seat," http://www.freedmanseating.com/images/uploads/files/GOSeat_Brochure_10-19.pdf, (date unknown), 2 pgs.
Metro Magazine, "Vehicle Seating Manufacturers Offer Flexible Dseign Options, Enhanced Construction," http://www.metro-magazine.com/article/prinl/2012/01/vehicle-seating-manufacturers-offer-flexible-design-options-enahnced-construction.aspx, Jan. 2012, 3 pgs.
"Seat Comfort Systems", Installation Manual, Kit P/N: SCSOOOOOC3, http://www.techwebasto.com/accessories_main/seat_accessories/g_scs_vent_install.pdf, (date unknown), 7 pgs.
Car Reviews, "Audi A4 Saloon RS4", http://www.theaa.com/allaboutcars/cartestreports/2006037.html, Apr. 2006, 5 pgs.
Recaro Gmbh & Co. KG, "Seat Range", ID No. 7218054, Mar. 2010, 21 pgs.
Kelley Blue Book, "2011 Mercedes-Benz CL-Class", http://www.kbb.com/mercedes-benz/cl-class/2011-mercedes-benz-cl-class/, Feb. 28, 2013, 5 pgs.
Lexus, "The all-new Lexus 2013", lexus.com P2-332, Feb. 2012, 13 pgs.
Mercedes-Benz, "Interior comfort—spoilt for choice", http://www.zungfu.com/pc_E_saloon.comfort.1.shtml, Feb. 28, 2013, 3 pgs.
Rostra Precision Controls Inc., "Universal Lumbar Installation Instructions", http://www.rostra.com/manuals/form3132F.pdf, Nov. 2, 2007, 8 pgs.
"Seats", http://www.bavarianmw.com/guide-4400.html, www.bmwmanuals.org, 2012, 5 pgs.
Mercedes-Benz, "Seat belts and airbags", http://www.mbusa.com/vcm/MB/DigitalAssets/pdfmb/serviceandparts/ seatbelts_airbags.pdf, Oct. 27, 2005, 11 pgs.
SAE International, "Capacitive Sensors Increase Safety, Comfort", http://sae.org/automag/technewsletter/071106Electronics/04.htm, Jun. 13, 2013, 3 pages.
General Motors LLC, "2013 Chevrolet Spark Owner Manual," copyright 2012, 356 pages.

\* cited by examiner

INTEGRATED DECKING ARM SUPPORT FEATURE

CROSS-REFERENCE TO RELATED APPLICATION

The present application is a continuation-in-part of and claims priority to U.S. application Ser. No. 15/178,258, filed on Jun. 9, 2016, now U.S. Pat. No. 10,166,894, entitled "SEATBACK COMFORT CARRIER," the entire disclosure of which is incorporated herein by reference.

FIELD OF THE DISCLOSURE

The present disclosure generally relates to a vehicle seating assembly, and more particularly to a seatback comfort carrier for a vehicle seating assembly.

BACKGROUND OF THE DISCLOSURE

Vehicle seating assemblies typically include a seatback to support a back of an occupant in an upright sitting position and various reclined positions. Similar to other portions of a vehicle seating assembly, seatbacks are commonly designed to support an occupant in the upright sitting position upon acceleration, change in direction, and collision of the vehicle. Accordingly, seatbacks are substantially rigid and sizeable in construction.

SUMMARY OF THE DISCLOSURE

According to one aspect of the present disclosure, a seating assembly includes a seatback having a frame and a cushion assembly. A cushion carrier includes a lower member defining a frame receiving cavity. A first set of ribs extend across the frame receiving cavity in a direction perpendicular to a longitudinal extent of the lower member. The first set of ribs extend between the lower member and a lower brace of the frame. A second set of ribs are parallel with the first set of ribs. The second set of ribs are longer than the first set of ribs.

According to another aspect of the present disclosure, a seating assembly includes a seatback having a frame and a cushion assembly. A cushion carrier includes a lower member defining a rearwardly-opening frame receiving cavity. A plurality of vertically-oriented ribs are positioned across the rearwardly-opening frame receiving cavity in a direction perpendicular to a longitudinal extent of the lower member. The plurality of vertically-oriented ribs abut a lower brace of the frame.

According to yet another aspect of the present disclosure, a seating assembly includes a seatback having a frame and a cushion assembly. A cushion carrier includes a lower member defining a frame receiving cavity. A plurality of ribs extend across the frame receiving cavity in a direction perpendicular to a longitudinal extent of the lower member. The plurality of ribs extend between the lower member and a lower brace of the frame.

These and other aspects, objects, and features of the present disclosure will be understood and appreciated by those skilled in the art upon studying the following specification, claims, and appended drawings.

DETAILED DESCRIPTION OF THE EMBODIMENTS

Figures 1, 2:
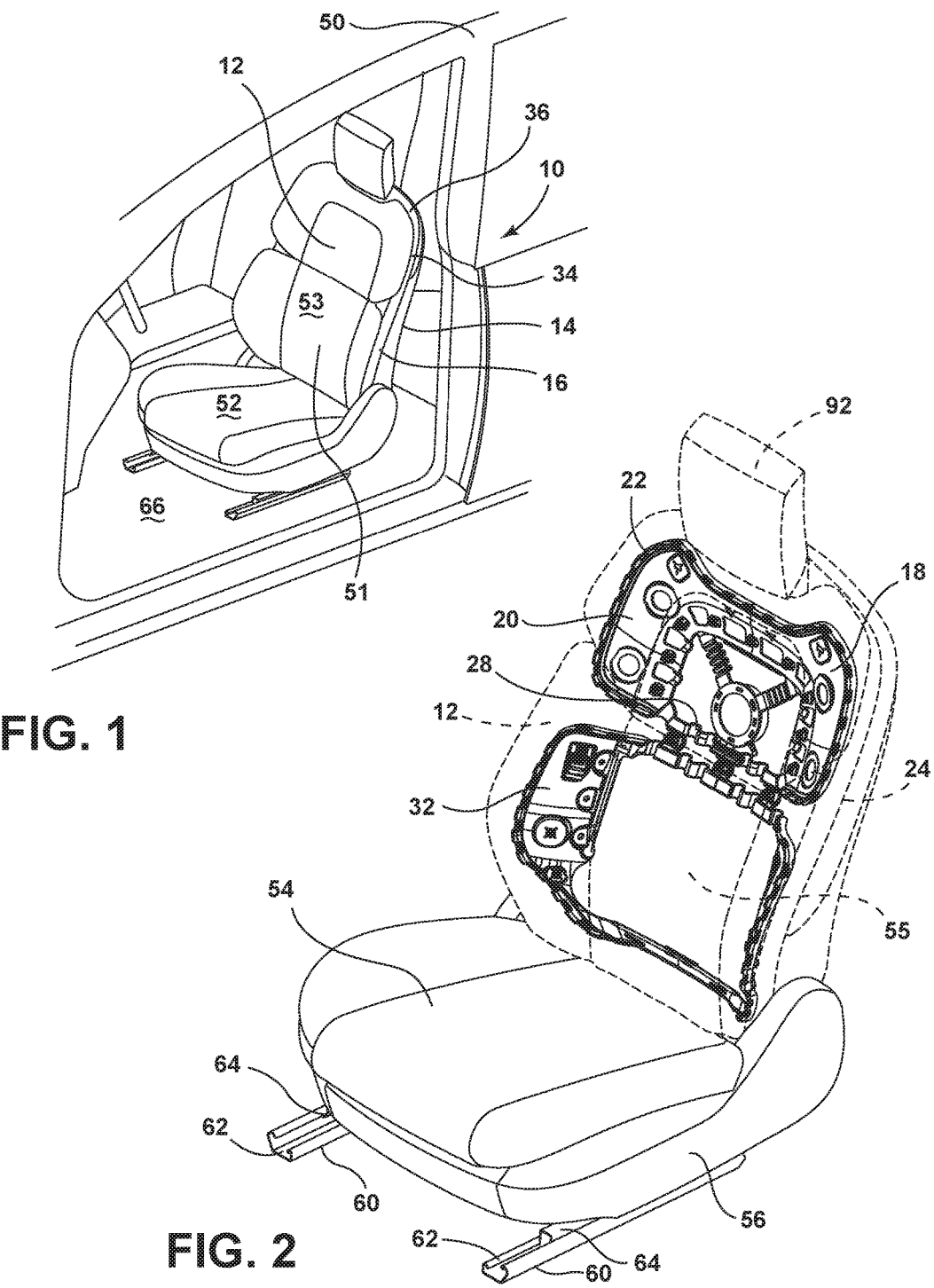
FIG. 1 is a top perspective view of one embodiment of a vehicle seating assembly of the present disclosure.
FIG. 2 is a top perspective view of the vehicle seating assembly of FIG. 1, but with a majority of the vehicle seating assembly in phantom and a seatback carrier shown in solid.
Figure 3:
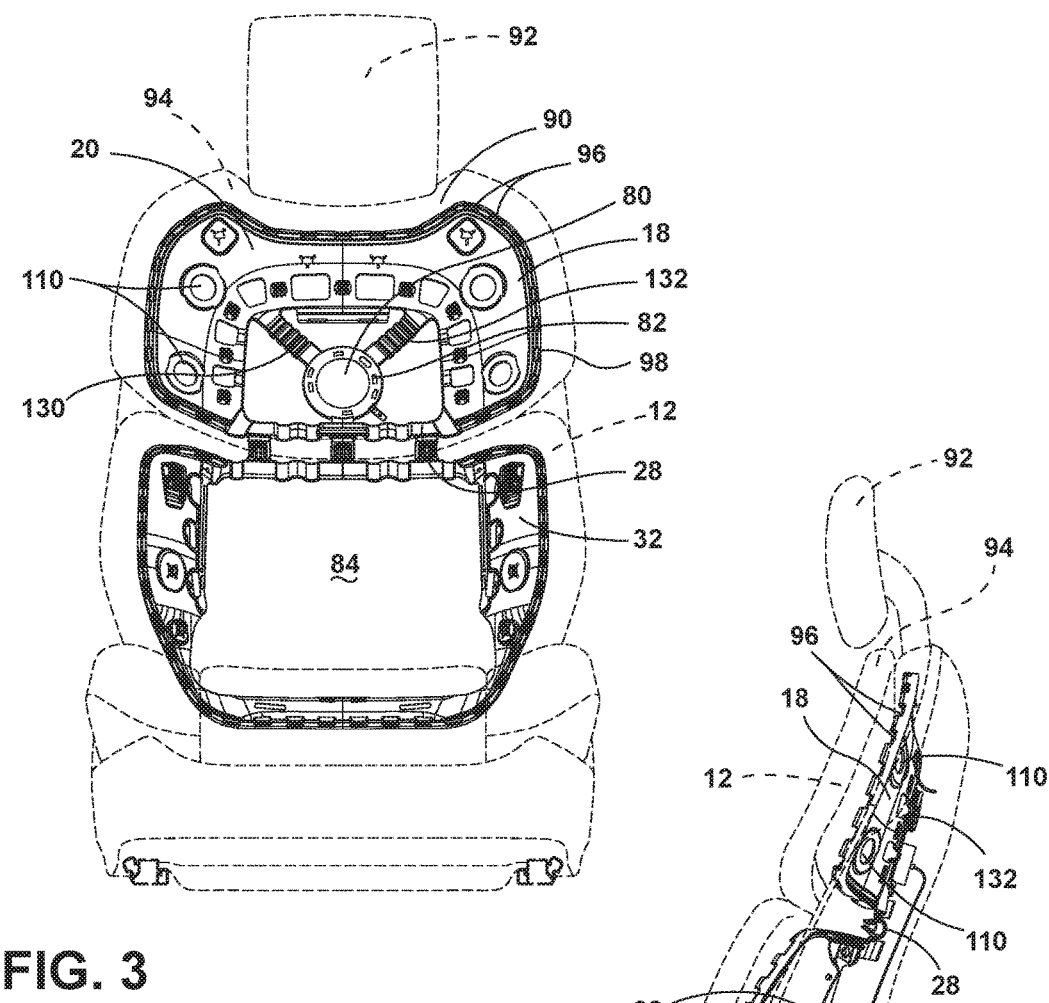
FIG. 3 is a front elevational view of the seatback carrier of FIG. 2.
Figure 4:
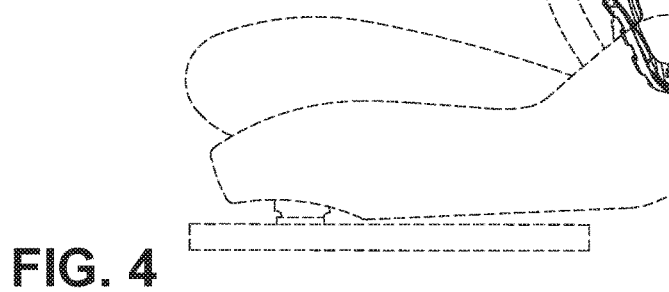
FIG. 4 is a side elevational view of the seatback carrier of FIG. 2.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-22, reference numeral 10 generally designates a vehicle seating assembly including a seatback 12 having a back panel 14 with a front closeout panel 16. A carrier 18 is supported inside the seatback 12 and includes an upper thoracic region 20 having a peripheral support 22. A peripheral gap 24 is defined between the front closeout panel 16 and the upper thoracic region 20. A bottom portion 26 of the upper thoracic region 20 includes a lower wall 28 having a sinusoidal configuration. The vehicle seating assembly 10 also includes a lower lumber region 32 having a peripheral support 34. A peripheral gap 36 is defined between the front closeout panel 16 and the lower lumber region 32. An upper portion 38 of the lower lumber region 32 includes an upper wall 40 having a sinusoidal configuration. A plurality of concave connectors 42 couple the lower wall 28 of the upper thoracic region 20 with the upper wall 40 of the lower lumber region 32.

With reference to FIGS. 1 and 2, the vehicle seating assembly 10 is generally configured for use inside a vehicle 50 and includes a seat 52 defining a seating surface 51 in addition to the seatback 12 defining a seatback surface 53. Both the seat 52 and the seatback 12 include a cushion assembly 54, 55, respectively, disposed thereon. It is generally contemplated that the vehicle 50 may include an automobile, such as a car, a truck, or a van, and that the vehicle seating assembly 10 will be adjustable within the vehicle 50. The cushion assembly 54 is coupled with a seat frame 56, while the cushion assembly 55 is supported on a seatback frame 57. The vehicle seating assembly 10 is positioned on a slide assembly 60, including a rail 62 and a slide 64. The rail 62 is generally fastened to a floor 66 of the vehicle 50 and the slide 64 is fastened to the vehicle seating assembly 10. The rail 62 and the slide 64 are slidably adjustable relative to one another, such that the vehicle seating assembly 10 is adjustable fore and aft within the vehicle 50. The vehicle seating assembly 10 also includes a variety of other adjustability functions, including adjustability of the seatback 12, which may include upper thoracic and lumbar support, as well as reclining functions. The seat 52 is also adjustable and includes thigh and leg adjustability.

With reference to FIGS. 2-6, in the illustrated embodiment, the carrier 18 for the seatback 12 is configured to support the weight of a passenger applying pressure to the cushion assembly 55 disposed on the seatback 12. Accordingly, the carrier 18 generally creates an interface between the cushion assembly 55 and the structural components of the seatback 12. The carrier 18 includes a variety of connection points for coupling with the cushion assembly 55, a coverstock 74, and directly to the seatback frame 57. The carrier 18 is generally defined by the upper thoracic region 20 and the lower lumber region 32. The concave connectors 42 couple the lower wall 28 of the upper thoracic region 20 with the upper wall 40 of the lower lumber region 32. The upper thoracic region 20 generally defines an interior cavity 80 within which a fan support 82 is positioned. Similarly, the lower lumber region 32 also defines a central space 84 that may include climate comfort features, lumbar support features, etc.

With reference to FIGS. 2-4 and 6-9, the carrier 18 includes an upper scalloped portion 90 configured to accommodate a head restraint 92 disposed on a top portion 94 of the seatback 12. In addition, the carrier 18 includes a plurality of coverstock detents 96 disposed about a peripheral edge 98 of the carrier 18. The coverstock detents 96 are configured to receive fasteners disposed about a periphery 100 of the coverstock 74. The fasteners are designed to engage directly with the peripheral edge 98 of the carrier 18, thereby supporting the coverstock 74 and the cushion assembly 55 on the carrier 18. In addition, the upper thoracic region 20 of the carrier 18 includes snap-fit connection apertures 110 designed to receive snap-fit connectors disposed on a forward side of an articulating upper thoracic support of the seatback 12. A plurality of coverstock securing members 120 are located adjacent to an intermediate space 122 defined in the upper thoracic region 20. The coverstock securing members 120 are spaced a predetermined distance and designed to engage intermediate fasteners on a backside of the coverstock 74. In addition, a variety of spacing apertures 124 are disposed between each of the coverstock securing member 120.

With reference again to FIGS. 2-4 and 6-9, the fan support 82 is operably coupled with the lower wall 28 of the upper thoracic region 20 and also coupled with first and second angled supports 130, 132. Each of the first and second angled supports 130, 132 extends into the intermediate space 122 of the upper thoracic region 20 and each includes an undulating or sinusoidal configuration. This construction allows for flexibility and movement of the fan support 82 to accommodate the different weights of users and also different postures and loads that can affect the seatback 12. As previously noted, the bottom portion of the upper thoracic region 20 includes the lower wall 28, which has an undulating or sinusoidal configuration. Notably, the undulating or sinusoidal configuration of the lower wall 28 of the upper thoracic region 20 undulates in a plane generally parallel with a seating surface of the seat 52. Accordingly, the undulations extend forward and rearward relative to the seatback surface. The upper portion of the lower lumbar region 32, and more specifically, the upper wall 40 of the lower lumber region 32 includes a sinusoidal configuration as well. The sinusoidal configuration of the upper wall 40 of the lower lumber region 32 also undulates forward and rearward relative to the seatback 12. It will be understood that the carrier 18 is generally curved to complement the shape of the back of an occupant. More specifically, the upper thoracic region 20 is shaped to generally cradle and support the upper back of an occupant, while the lower lumbar region 32 is designed to cradle and support the lower back of an occupant.

Figure 5:
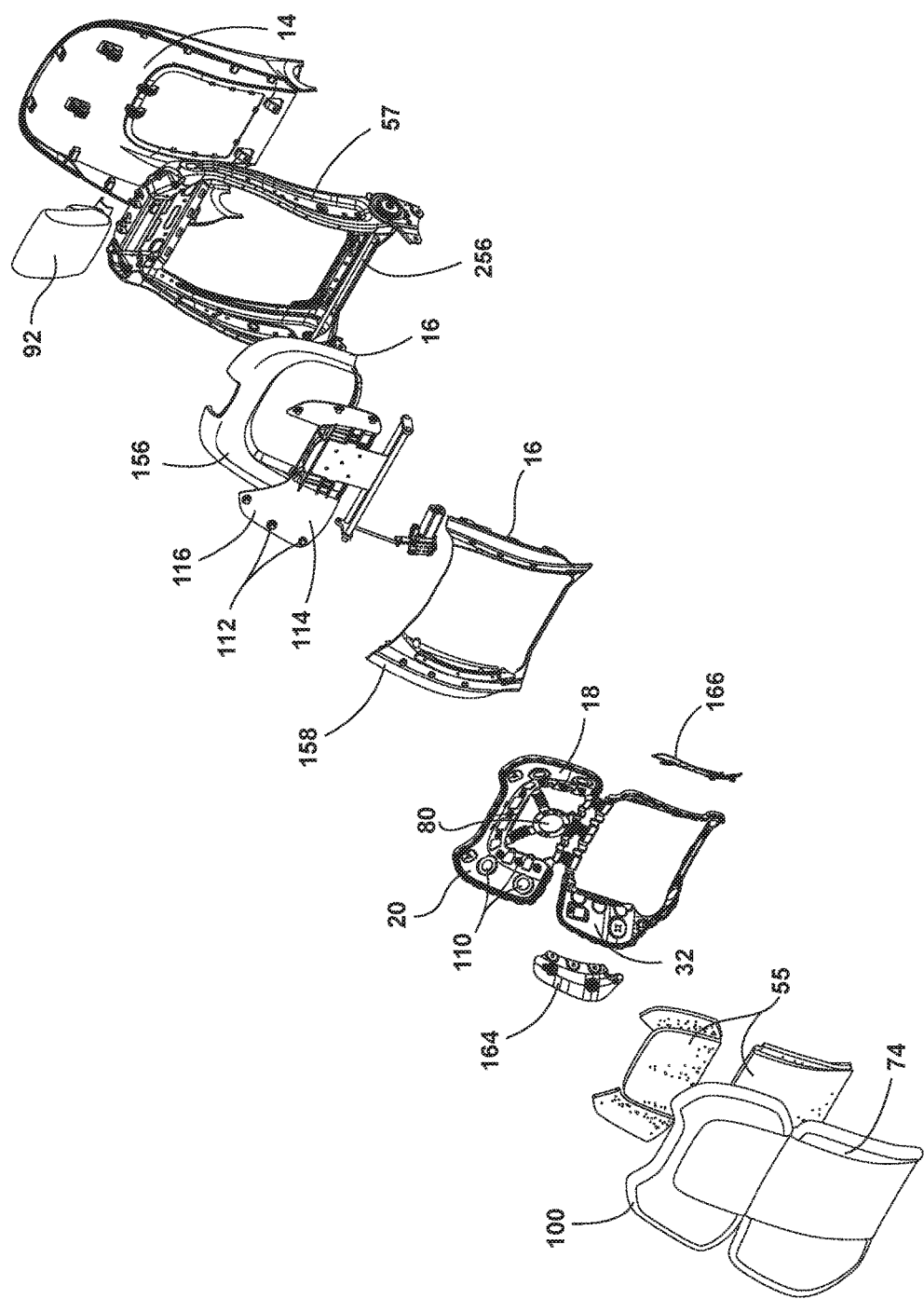
FIG. 5 is a top perspective exploded view of the vehicle seatback assembly of the present disclosure.
Figure 6:
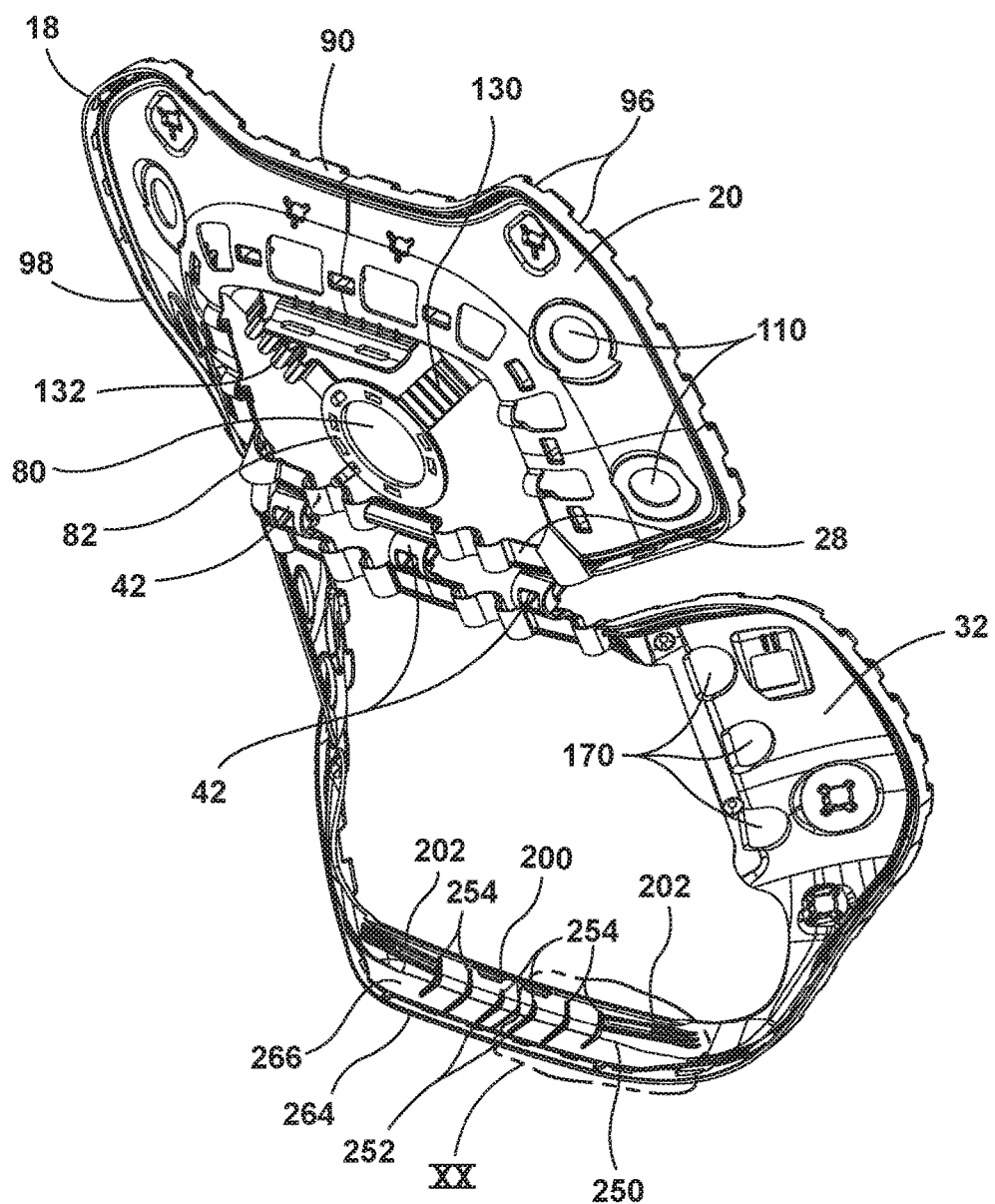
FIG. 6 is a top rear perspective view of the seatback carrier of FIG. 5.
Figure 7:
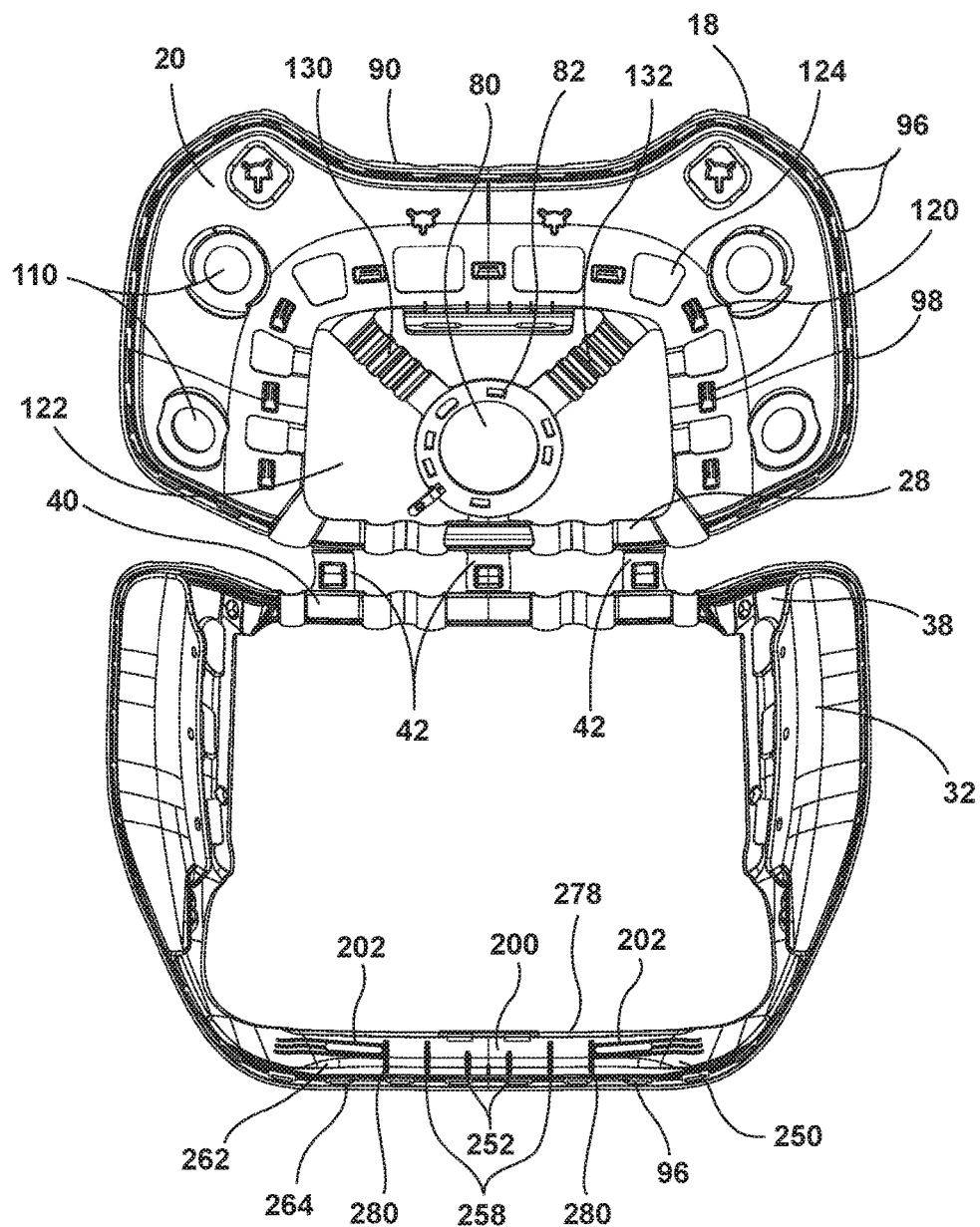
FIG. 7 is a rear elevational view of the seatback carrier of FIG. 6.
Figure 8:
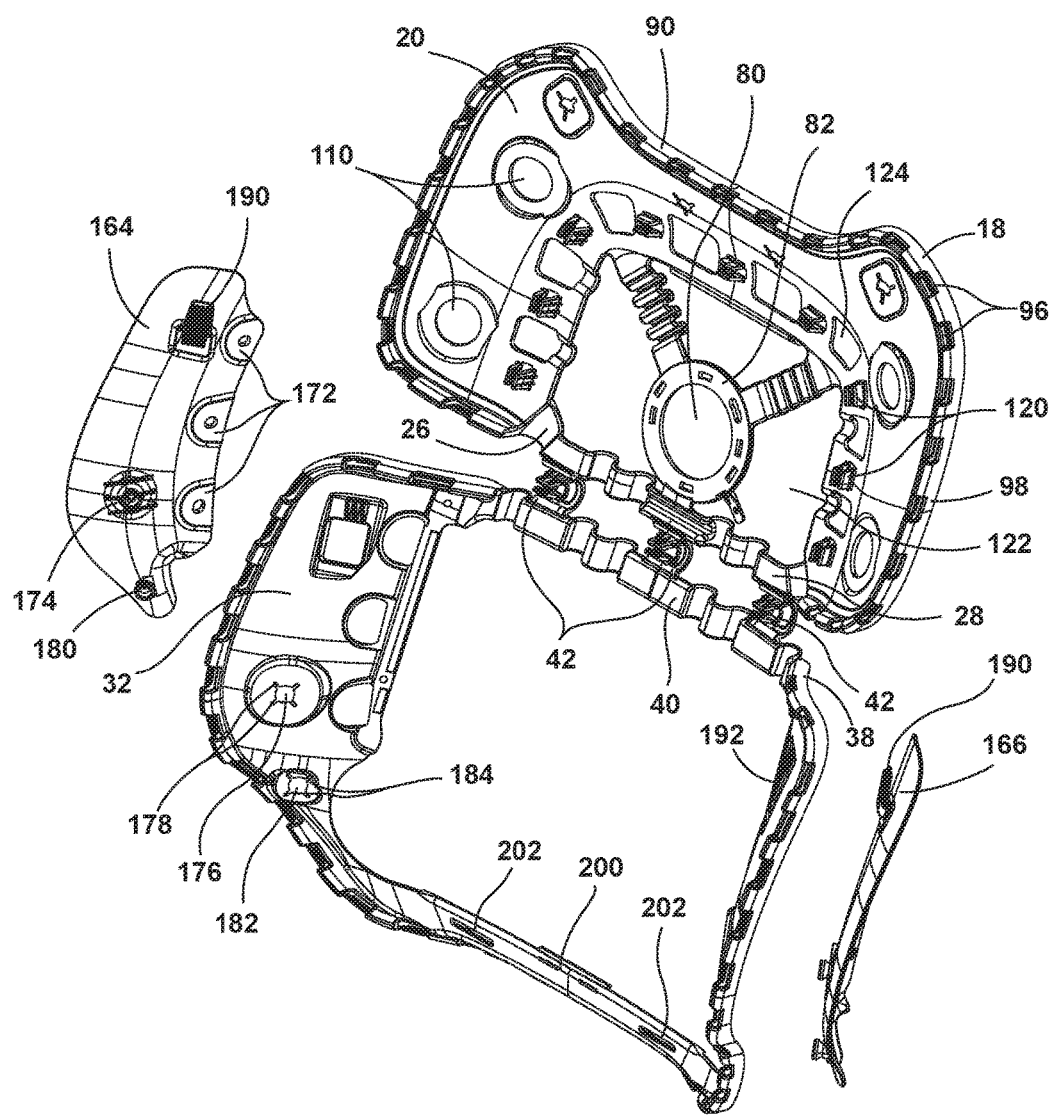
FIG. 8 is a top perspective view of the seatback carrier of FIG. 5, before installation of side cushion supports.
Figure 9:
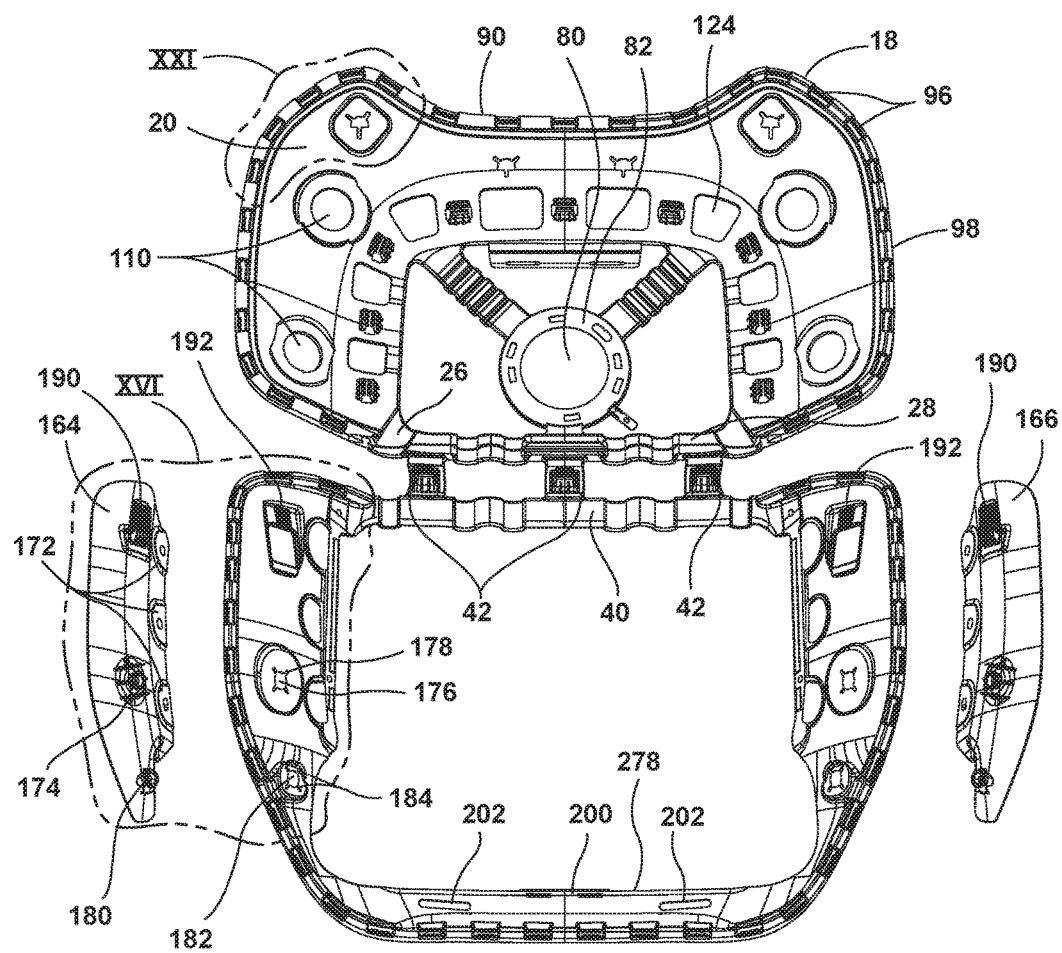
FIG. 9 is a front elevational view of the seatback carrier and cushion supports of FIG. 8.
Figure 10:
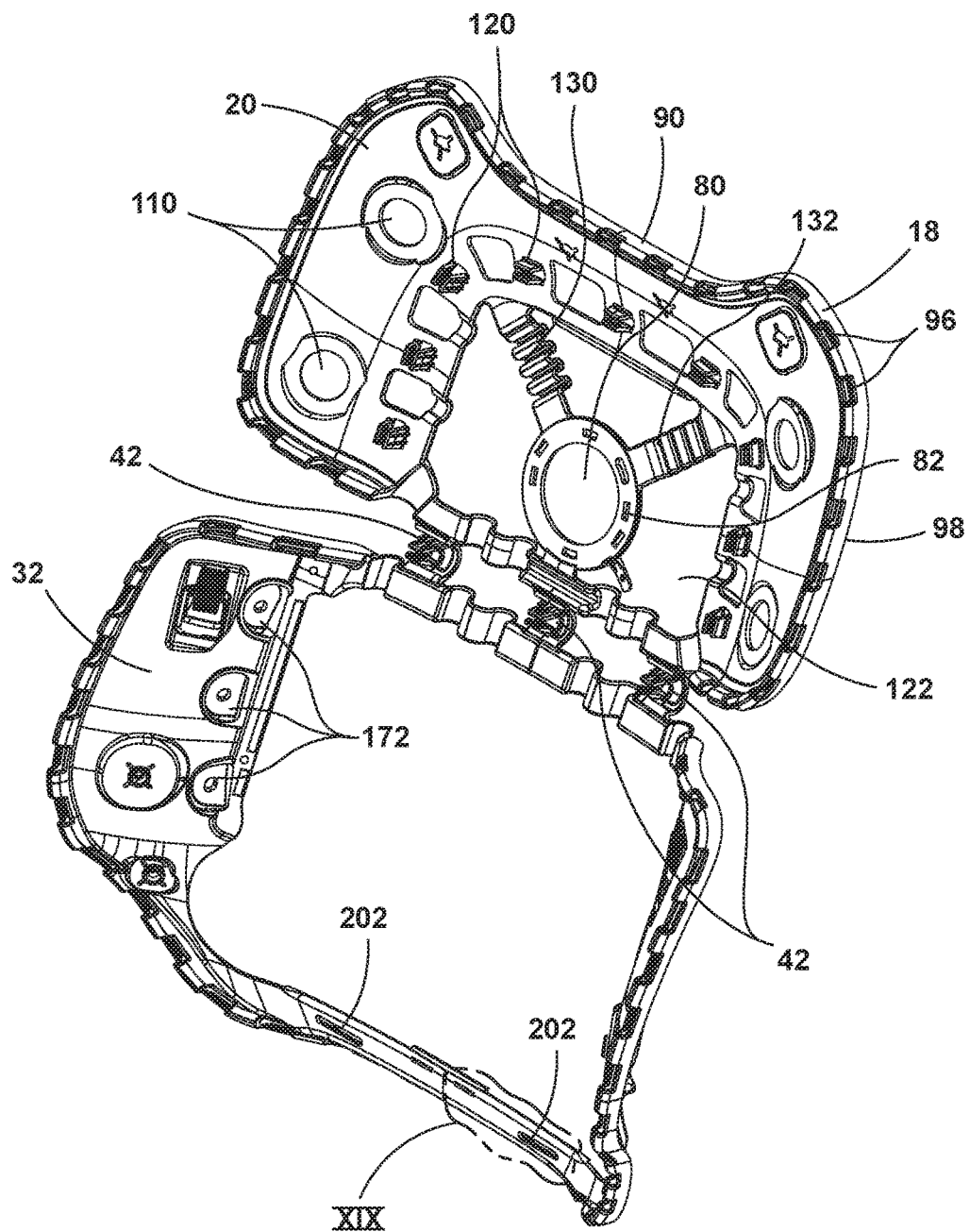
FIG. 10 is an enlarged top perspective view of a seatback carrier of the present disclosure.
Figure 11:
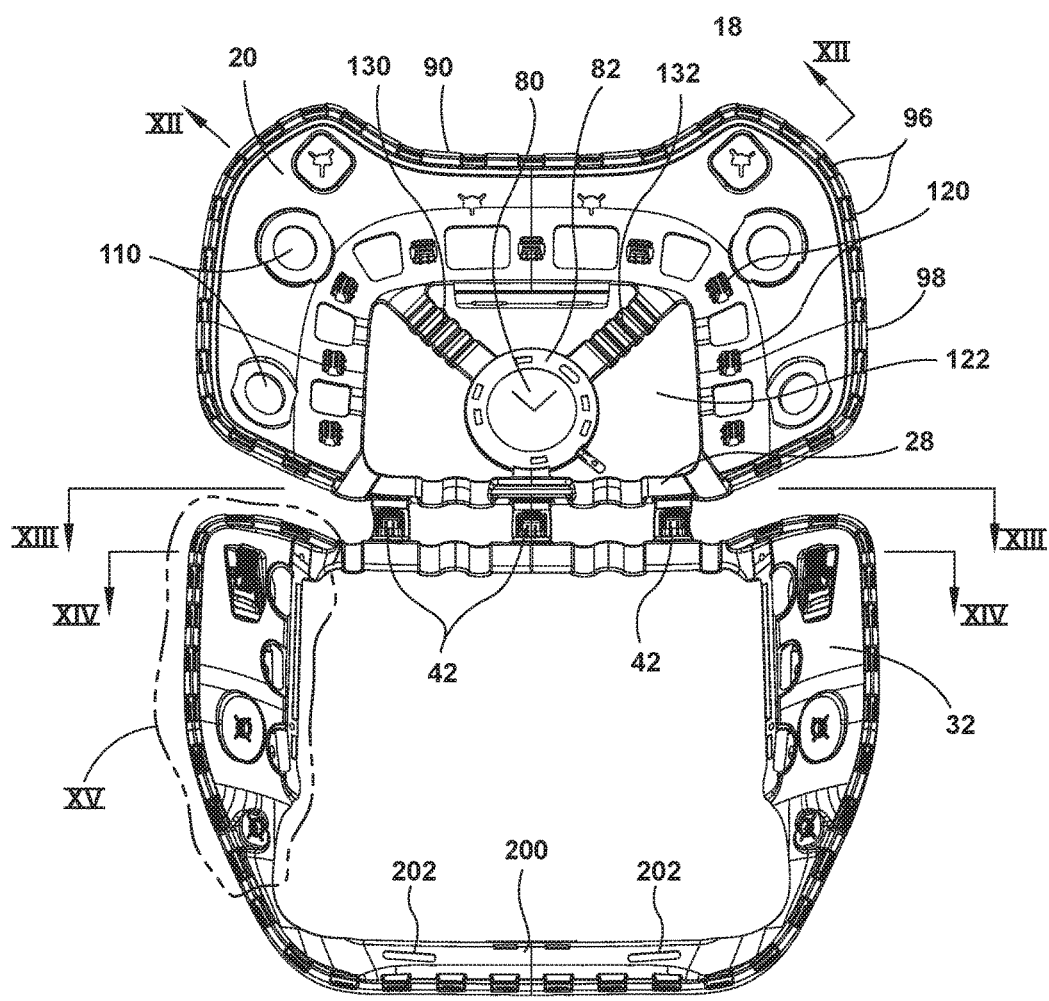
FIG. 11 is a front elevational view of the seatback carrier of FIG. 10.

With reference now to FIG. 5, in the illustrated embodiment, the seatback 12 of the vehicle seating assembly 10 includes the following components. The seat frame 56 is connected with the seat 52 and provides general structural support to the occupant. The back panel 14 is connected with a rear portion of the seatback frame 57. The head restraint 92 is disposed above the seatback frame 57 and is operably coupled therewith. The head restraint 92 may include a variety of functions, including forward and rearward motion, as well as upward and downward motion, to better support the head of an occupant. In addition, the vehicle seating assembly 10 includes an upper thoracic support 116 that is adjustable between forward and rearward positions. The upper thoracic support 116 is located in front of the front closeout panel 16. The front closeout panel 16 includes an upper portion 156 and a lower portion 158. The upper portion 156 of the front closeout panel 16 wraps around a front portion of the seatback frame 57 and couples with the hard back panel 14. The lower portion 158 of the front closeout panel 16 engages with a lower portion of the seatback frame 57 and engages a lower portion of the hard back panel 14. The peripheral gap 24 is defined between the upper portion 156 of the thoracic support 116 and the front closeout panel 16. The peripheral gap 24 is also located between the lower lumbar region 32 and the lower portion 158 of the front closeout panel 16. First and second side support members 164, 166 are configured to be fastened with sides of the carrier 18. The entire carrier 18, as well as first and second side support members 164, 166, are designed to engage the upper portion 156 and the lower power 158 of the front closeout panel 16. At the same time, the carrier 18 supports the cushion assembly 55 and the coverstock 74. The cushion assembly 55 may be operably coupled with the coverstock 74 via a glue or adhesive, or via fasteners configured to engage the front of the cushion assembly 55, as previously disclosed.

With reference now to FIGS. 6-10, 15 and 16, the carrier 18 includes openings 170 on each side of the lower lumbar region 32. The openings 170 are designed to receive engagement features 172 on each of the first and second side support members 164, 166. In addition, a lower protuberance 174, which extends in a forward direction, is configured to engage an aperture 176 having peripheral slots 178. The aperture 176 is configured to receive the protuberance 174 and secure the same such that the first and second side support members 164, 166 can be retained on the carrier 18. In addition, a second lower protuberance is disposed below the protuberance 174, and is configured to engage a lower aperture 182 on the carrier 18. A lower opening 182 also includes peripheral slots 184. Each of the protuberances 174, 180 maintain the first and second side support members 164, 166 in secure abutment with the carrier 18. In addition, an upwardly turned hook 190 is disposed on an upper portion of each of the first and second side support members 164, 166. The upper hook securely engages an engagement wall 192 on a forward side of the carrier 18. It will be understood that the first and second side support members 164, 166 are mirror images of one another.

Figure 12:
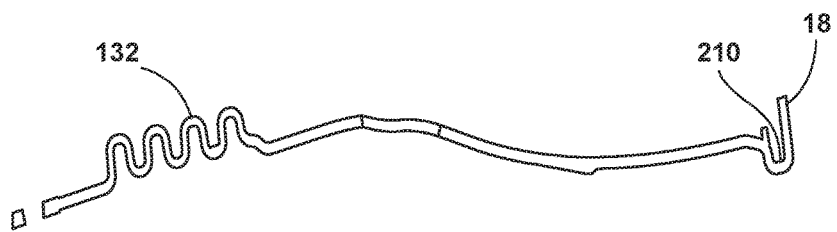
FIG. 12 is a top cross-sectional view taken at line XII-XII of FIG. 11.
Figure 13:
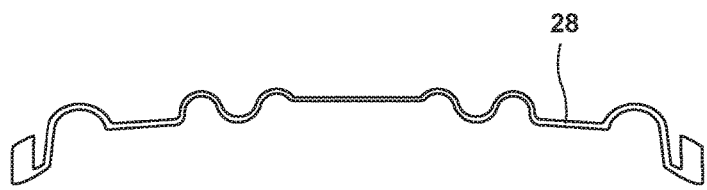
FIG. 13 is a top elevational cross-sectional view taken through line XIII-XIII of FIG. 11.
Figure 14:
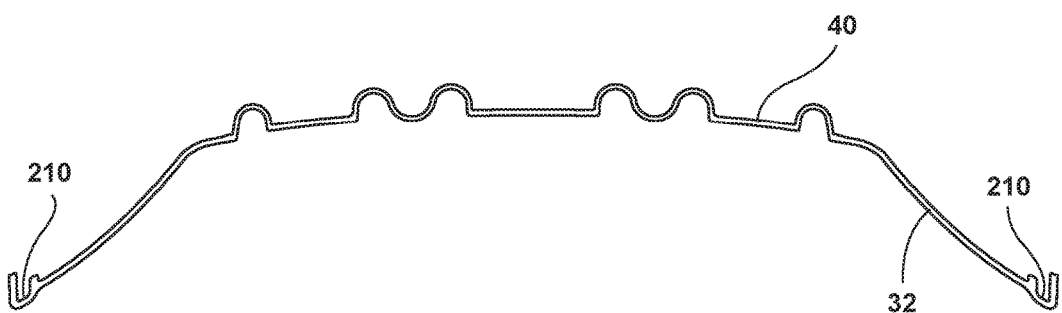
FIG. 14 is a top elevational cross-sectional view of line XIV-XIV of FIG. 11.
Figure 15:
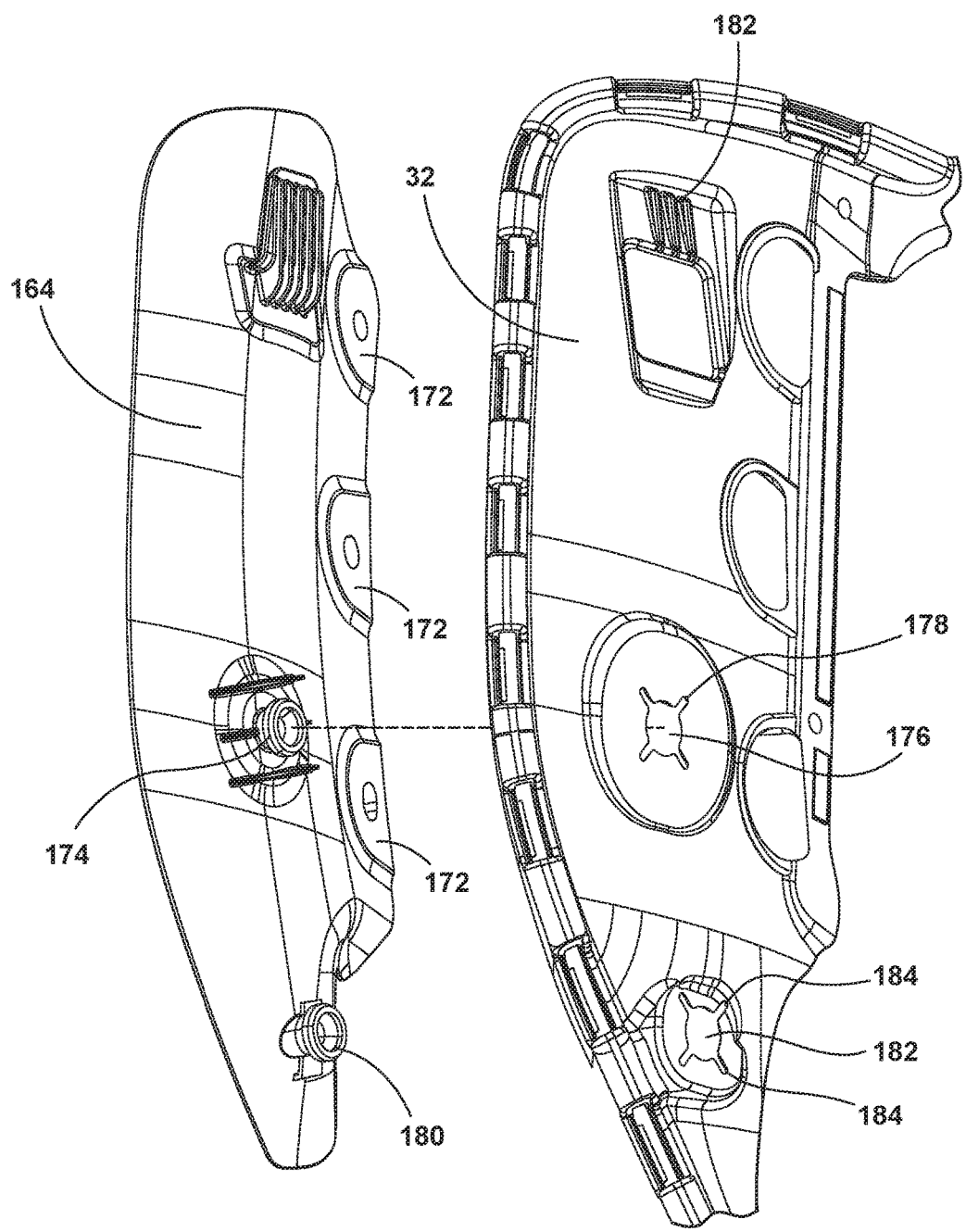
FIG. 15 is a front elevational view of area XV of FIG. 11.
Figure 16:
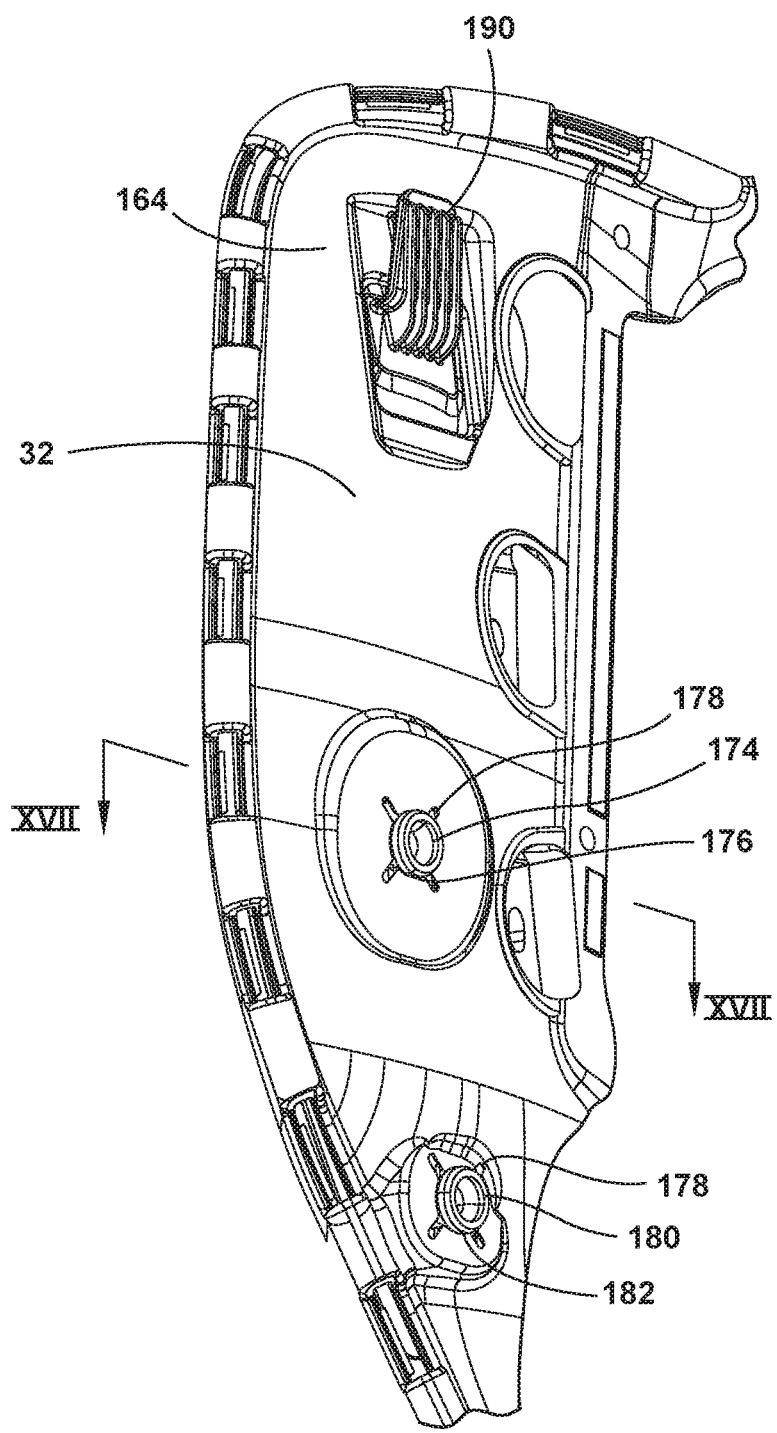
FIG. 16 is a front elevational view of area XVI of FIG. 9.

With reference now to FIGS. 12-14, various undulating or sinusoidal configurations of portions of the carrier 18 are illustrated. FIG. 12 illustrates an undulating or configuration that extends along the first and second angled supports 130, 132. The undulating configuration that extends along the first and second angled supports 130, 132 allows flexibility of the fan support 82 such that the fan support 82, or a fan disposed therein, does not provide for an uncomfortable projection into the back of a passenger. In addition, the first and second angled supports 130, 132, and the sinusoidal configuration of the first and second angled supports 130, 132, allow for flexible movement of the fan support 82 relative to the already flexible carrier 18. FIG. 13 illustrates the sinusoidal configuration across the lower wall 28 of the upper thoracic region 20. The sinusoidal configuration allows for flexible movement of the upper thoracic region 20 relative to the lower lumbar region 32. The lower wall 28 of the upper thoracic region 20 is operably coupled with the upper wall 40 of the lower lumbar region 32 via the concave connectors 42. Accordingly, flexibility in both lateral and vertical directions is provided. For even additional flexibility, the sinusoidal configuration is provided in the upper wall 40 of the lower lumbar region 32, as shown in FIG. 14. It will also be noted that a periphery of the upper thoracic region 20 and lower lumbar region 32 includes a rearwardly opening slot configured to receive trim stock fasteners that secure a trim stock to a rear portion of the carrier 18.

Figure 17:
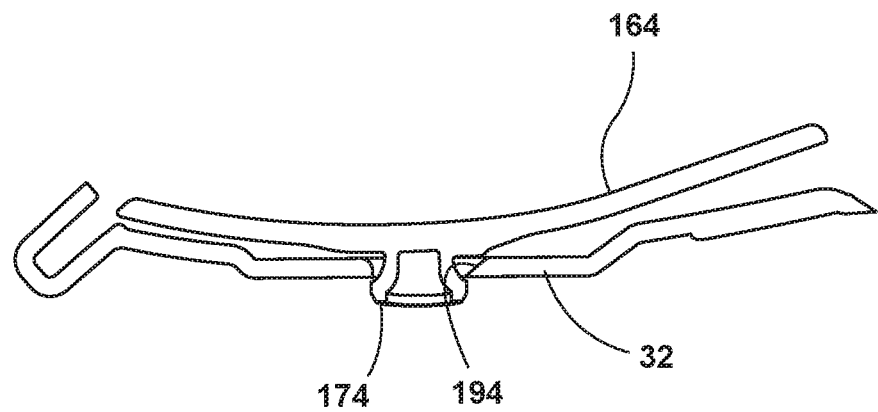
FIG. 17 is a top elevational cross-sectional view of the connecting members after engagement.
Figure 18:
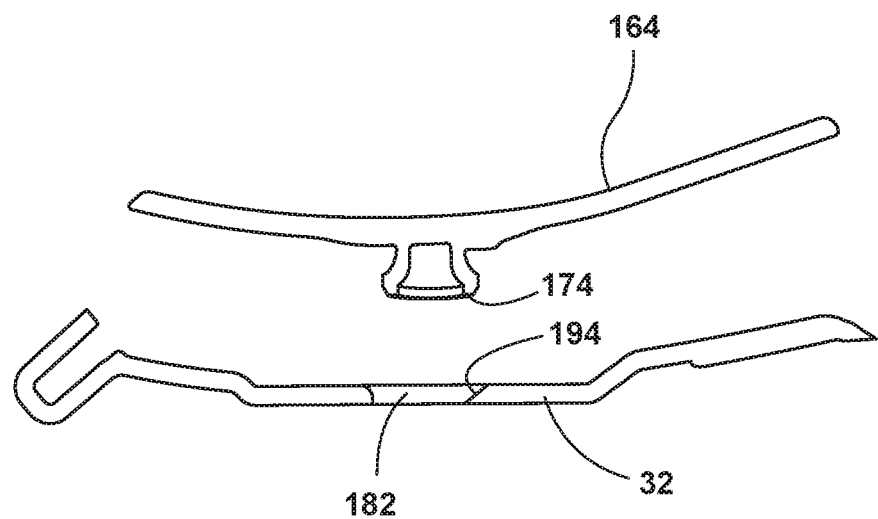
FIG. 18 is a top elevational cross-sectional view of the connecting members of FIG. 17, after disengagement.

With reference to FIGS. 17 and 18, the illustrated embodiment shows the configuration of the protuberances 174, 180 relative to the apertures 176, 182, respectively. As illustrated, an inner wall 194 that defines the apertures 176, 180 is canted or angled on a side of the apertures 176, 182 to provide an easier snap fit connection with the protuberances 174, 180. This construction has the added benefit of maintaining a more secure connection between the protuberances 174, 180 and the apertures 176, 182. The cant or angled wall portion is specifically sized and fitted to retain the protuberances 176, 180 during use.

Figure 19:
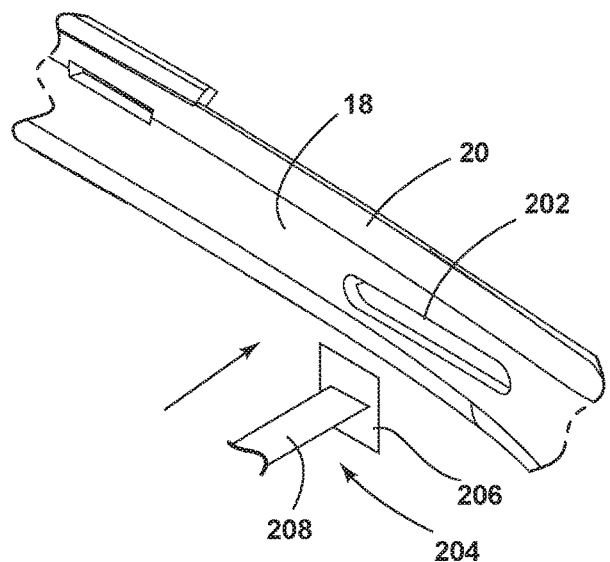
FIG. 19 is a top perspective view of area XIX of FIG. 10.
Figure 20:
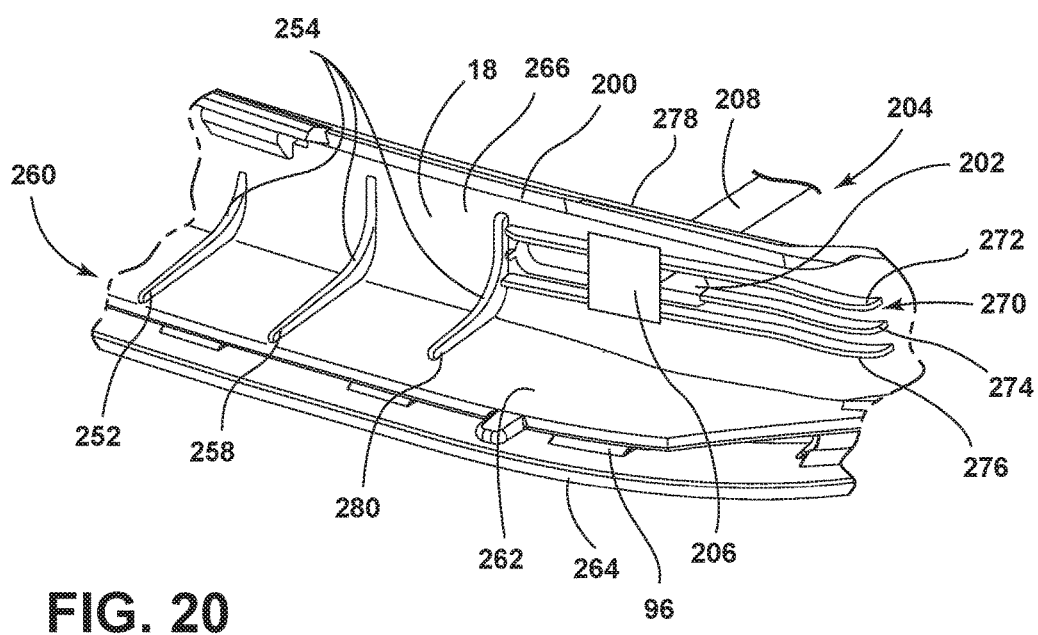
FIG. 20 is a rear perspective view of the seatback carrier of FIG. 6 taken of area X-X.

With reference now to FIGS. 8-12, as well as FIGS. 19 and 20, a lower cross-member 200 of the carrier 18 includes lateral elongate slots 202. The elongate slots 202 are configured to receive engagement features in the form of retention tethers 204 that include a securing member 206 and a flexible band 208 connected to the securing member 206. The flexible band 208 may be secured with the cushion assembly 55 or the coverstock 74 and may be elastic in nature, allowing for expansion and contraction. The retention tethers 204 provide a releasable yet reliable engagement of the cushion assembly 55 with the carrier 18 (FIGS. 19 and 20).

Figure 21:
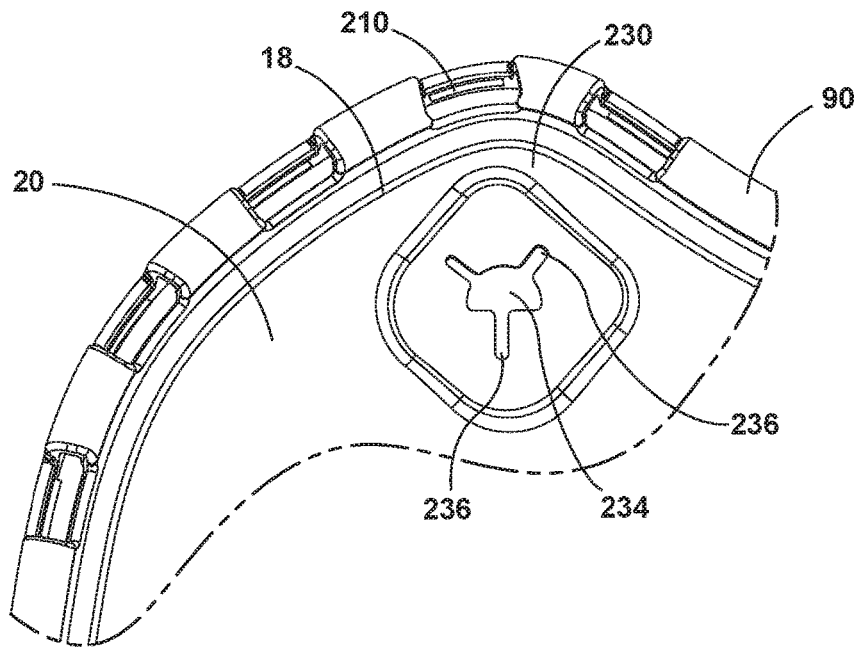
FIG. 21 is a partial front elevational view of the seatback carrier of FIG. 9 taken at area XXI-XXI.
Figure 22:
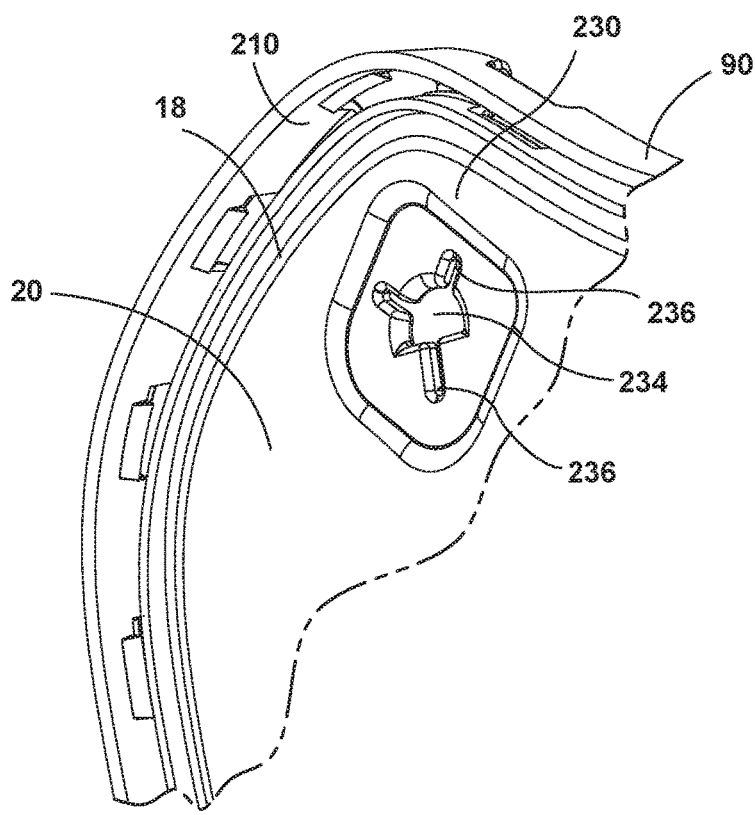
FIG. 22 is a rear perspective view of the carrier portion shown in FIG. 21.

With reference now to FIGS. 21 and 22, upper corners 230 of the carrier 18, and more specifically of the upper thoracic region 20 of the carrier 18, include a generally planar portion with a fastener receiving aperture 234. The fastener receiving aperture 234 includes slots configured to accommodate a mechanical fastener engaging the fastener receiving aperture 234. The fastener receiving aperture 234 includes a generally semicircular construction with slots 236 extending therefrom. In the illustrated embodiment, the slots 236 extend approximately 120 degrees from one another. However, it will be understood that the slots 236 may extend at any angle relative to one another, and may be more than or less than three slots 236 that extend from the fastener receiving aperture 234.

Figure 23:
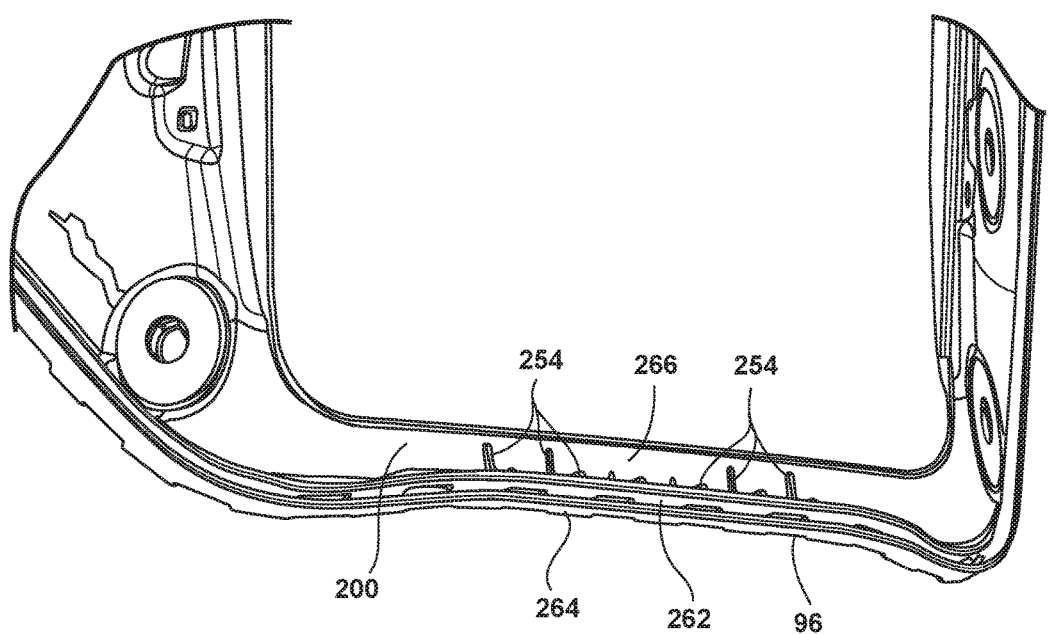
FIG. 23 is a bottom perspective view of a portion of a seatback carrier.
Figure 24:
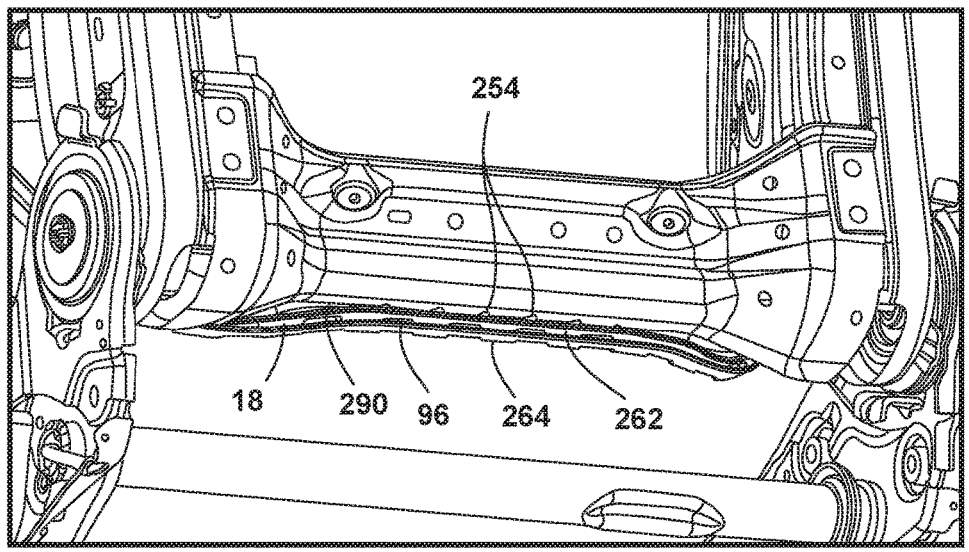
FIG. 24 is a rear bottom perspective view of a seatback carrier installed on a seatback.
Figure 25:
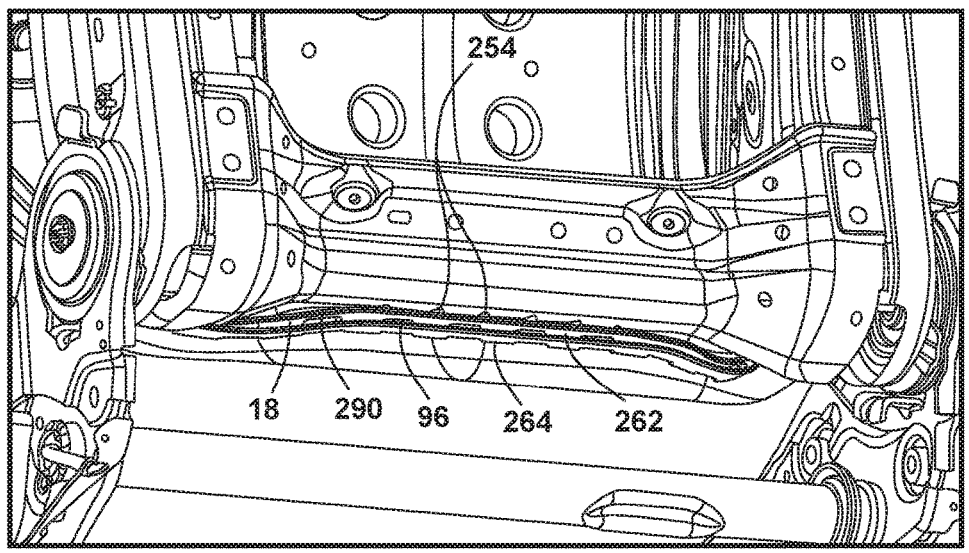
FIG. 25 is a rear bottom perspective view of the seatback carrier of FIG. 24 with the cushion assembly installed.

With reference now to FIGS. 23-25, the vehicle seating assembly 10 of the cushion assembly 55 is supported by the carrier 18. The lower cross-member 200 of the carrier 18 generally defines a frame receiving cavity 250. A first set 252 of ribs 254 extend across the frame receiving cavity 250 in a direction perpendicular to a longitudinal extent of the lower cross-member 200. The first set 252 of ribs 254 extend between the lower cross-member 200 and a lower brace 256 of the seatback frame 57. A second set 258 of ribs 254 are parallel with the first set 252 of ribs 254. The second set 258 of ribs 254 are longer than the first set 252 of ribs 254.

With reference again to FIGS. 6-8, the lower cross-member 200 generally defines an integrated decking arm support feature that is configured to handle 1.5 times the overall seat mass of the vehicle seating assembly 10. The ribs 254 of the lower cross-member 200 provide structural rigidity to the lower cross-member 200. During assembly, the carrier 18, and specifically the integrated decking arm feature of the lower cross-member 200, withstands a substantial load to allow the seating assembly 10 to be decked in the vehicle 50 using existing vehicle assembly decking arm technologies. This design is integrated into the lower area of the carrier 18, where the lower cross-member 200 nests or abuts the steel cross-member of the seatback frame 57. More specifically, the plurality of ribs 254, which are disclosed in further detail herein, nest against the lower brace 256, typically made of steel, are configured for compressive loading, while maintaining a robust cross-section to resist crushing and/or deformation to the carrier 18 while the seating assembly 10 is being positioned inside the vehicle 50.

With reference again to FIGS. 6-8, as well as FIG. 20, the lower cross-member 200 includes a double flange construction 260, including an upper flange 262 and a lower flange 264 to provide additional rigidity to the lower cross-member 200. The upper flange 262 generally defines a lateral wall that is integral with a forward vertical wall 266. This construction provides additional rigidity to the lower cross-member 200. A plurality of transverse ribs 270 are disposed proximate each of the elongate slots 202. In the illustrated embodiment, a top rib 272 is disposed above the elongate slot 202, an intermediate rib 274 is disposed adjacent to the elongate slot 202, and a lower rib 276 is disposed below the elongate slot 202. It will be understood that the features, as illustrated in FIG. 20, which illustrate a rear left side of the lower cross-member 200 of the carrier 18, will be similarly arranged on the rear right side of the seatback carrier 18 in a mirror like construction. Notably, coverstock detents 96 are defined in the double flange construction 260 of the lower cross-member 200. More specifically, the coverstock detents 96 are defined between the upper flange 262 and the lower flange 264 of the double flange construction 260.

With reference again to FIGS. 6-8, 20, and 23-25, the rib features include three sets of ribs (254 (FIG. 7) having slightly varying constructions. Specifically, the first set 252 of ribs 254 are inner ribs that extend from a rear edge of the upper flange 262 forward and into contact with the vertical wall 266 of the lower cross-member 200. The second set 258 of ribs 254, an intermediate set of ribs, extends from a rearmost edge of the upper flange 262 of the lower cross-member 200 forward and upward to a position proximate a top edge 278 of the vertical wall 266 of the lower cross-member 200. A third set 280, an outermost set of ribs 254, extends from an intermediate area of the upper flange 262 of the lower cross-member 200 to the intersection of the upper flange 262 and the vertical wall 266, and up the vertical wall 266 to an intermediate area of the vertical wall 266 before terminating. Each set of ribs 254 includes different configurations to aid in the overall strength, yet lightweight, properties of the lower cross-member 200, and consequently the carrier 18. In addition, the lower cross-member 200 is generally constructed from a polymeric material, as are the vertically-oriented ribs 254. Additionally, the vertically-oriented ribs 254 define a space 290 between the lower cross-member 200 and the lower brace of the seatback frame 57. As previously noted, the vertically-oriented ribs 254 are generally configured to take on compressive loads, but maintain spacing between the lower cross-member 200 and the lower brace 256 of the seatback frame 57. The lower cross-member 200 generally defines a lower boundary of a climate control opening. Thus, the lower cross-member 200 defines the lower edge of the central space 84, which is configured to accommodate climate control features, lumbar support features etc., of the vehicle seating assembly 10.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A seating assembly comprising:
   a seatback including a frame and a cushion assembly;
   a cushion carrier including a lower lumbar region defining a central space therethrough, the cushion carrier supporting the cushion assembly and including a lower cross-member defining a frame receiving cavity;
   a first set of ribs disposed on the lower cross-member and extending in a direction perpendicular to a longitudinal extent of the lower cross-member, the first set of ribs spaced across the lower cross-member and positioned between the lower cross-member and a lower brace of the frame; and a second set of ribs parallel with the first set of ribs and disposed on the lower cross-member, the second set of ribs being longer than the first set of ribs.

2. The seating assembly of claim 1, wherein the cushion carrier includes a double flange proximate the first and second sets of ribs.

3. The seating assembly of claim 1, wherein the first and second sets of ribs define a space between the lower cross-member and the lower brace.

4. The seating assembly of claim 1, wherein the first set of ribs are disposed centrally along the lower cross-member.

5. The seating assembly of claim 1, wherein the lower cross-member is constructed from a polymeric material.

6. The seating assembly of claim 1, wherein the lower cross-member defines a lower boundary of a climate control opening.

7. The seating assembly of claim 1, further comprising:
a plurality of transverse ribs disposed on sides of the lower cross-member and which extend in a direction orthogonal to the first set of ribs.

8. A seating assembly comprising:
a seatback including a frame;
a cushion carrier defining a central space therethrough and supporting a cushion assembly, the cushion carrier including a lower cross-member defining a rearwardly-opening frame receiving cavity; and
a plurality of vertically-oriented ribs positioned on the lower cross-member and extending in a direction perpendicular to a longitudinal extent of the lower cross-member, the plurality of vertically-oriented ribs abutting a lower brace of the frame.

9. The seating assembly of claim 8, wherein the cushion carrier includes a double flange proximate the plurality of vertically-oriented ribs.

10. The seating assembly of claim 8, wherein the plurality of vertically-oriented ribs define a space between the lower cross-member and the lower brace.

11. The seating assembly of claim 8, wherein the plurality of vertically-oriented ribs are disposed centrally along the lower cross-member.

12. The seating assembly of claim 8, wherein the lower cross-member is constructed from a polymeric material.

13. The seating assembly of claim 8, wherein the lower cross-member defines a lower boundary of a climate control opening.

14. The seating assembly of claim 8, further comprising:
a plurality of transverse ribs disposed on sides of the lower cross-member and which extend in a direction orthogonal to the first set of ribs.

15. A seating assembly comprising:
a seatback including a frame and a cushion assembly;
a cushion carrier supporting the cushion assembly and including a lower cross-member defining a frame receiving cavity; and
a plurality of ribs disposed on the lower cross-member and extending in a direction perpendicular to a longitudinal extent of the lower cross-member, the plurality of ribs positioned between the lower cross-member and a lower brace of the frame.

16. The seating assembly of claim 15, wherein the cushion carrier includes a double flange proximate the plurality of ribs.

17. The seating assembly of claim 15, wherein the plurality of ribs define a space between the lower cross-member and the lower brace.

18. The seating assembly of claim 15, wherein the plurality of ribs are disposed centrally along the lower cross-member.

19. The seating assembly of claim 15, wherein the lower cross-member is constructed from a polymeric material.

20. The seating assembly of claim 15, wherein the lower cross-member defines a lower boundary of a climate control opening.

* * * * *